US012731723B2

(12) United States Patent

Yan et al.

(10) Patent No.: US 12,731,723 B2

(45) Date of Patent: Sep. 8, 2026

(54) INTEGRATED BOTTOM SUNKEN SURFACE MOUNT AND/OR SWING INDUCTOR AND FABRICATION METHODS

(71) Applicant: EATON INTELLIGENT POWER LIMITED, Dublin (IE)

(72) Inventors: Yipeng Yan, Shanghai (CN); Dengyan Zhou, Shanghai (CN); Kyle Yun-Su Kim, Pleasanton, CA (US)

(73) Assignee: Eaton Intelligent Power Limited, Dublin (IE)

( * ) Notice: Subject to any disclaimer, the term of this patent is extended or adjusted under 35 U.S.C. 154(b) by 735 days.

(21) Appl. No.: 18/047,582

(22) Filed: Oct. 18, 2022

(65) Prior Publication Data

US 2024/0128012 A1 Apr. 18, 2024

(51) Int. Cl.
*H01F 27/29* (2006.01)

(52) U.S. Cl.
CPC ..... *H01F 27/292* (2013.01); *H01F 2027/297* (2013.01)

(58) Field of Classification Search
CPC .... H01F 27/292; H01F 2027/297; H01F 3/10; H01F 3/14; H01F 27/255; H01F 27/263; H01F 27/2847; H01F 27/2852; H01F 2027/065; H01F 27/306; H01F 17/04
USPC .................................... 336/65, 83, 192, 200
See application file for complete search history.

(56) References Cited

U.S. PATENT DOCUMENTS

| | | | |
|---|---|---|---|
| 7,986,208 | B2 | 7/2011 | Yan |
| 8,183,967 | B2 | 5/2012 | Yan |
| 8,188,824 | B2 | 5/2012 | Yan |
| 8,279,037 | B2 | 10/2012 | Yan |
| 8,289,121 | B2 | 10/2012 | Yan |
| 8,310,332 | B2 | 11/2012 | Yan |
| 8,378,777 | B2 | 2/2013 | Yan |
| 8,400,245 | B2 | 3/2013 | Yan |
| 8,466,764 | B2 | 6/2013 | Bogert |
| 8,659,379 | B2 | 2/2014 | Yan |
| 8,910,373 | B2 | 12/2014 | Yan |
| 8,941,457 | B2 | 1/2015 | Yan |
| 9,202,617 | B2 | 12/2015 | Zhou |
| 9,275,787 | B2 | 3/2016 | Yan |
| 9,842,682 | B2 | 12/2017 | Yan |

(Continued)

FOREIGN PATENT DOCUMENTS

| | | | |
|---|---|---|---|
| CN | 113851303 | A | 12/2021 |
| CN | 114068153 | A | 2/2022 |

OTHER PUBLICATIONS

U.S. Appl. No. 63/139,192, filed Jan. 19, 2021, Yan.
U.S. Appl. No. 17/191,956, filed Mar. 4, 2021, Yan.

*Primary Examiner* — Tuyen T Nguyen

(74) *Attorney, Agent, or Firm* — DiBerardino McGovern IP Group LLC

(57) ABSTRACT

Surface mount inductor components include pre-formed coils with integrated bottom sunken features and simply shaped core pieces configured to create magnetic gaps in an assembled core structure around the coils when desired. The magnetic gaps interrupt flux paths in the operating components and provide swing-inductor functionality. The magnetic gaps may be reliably and economically provided in the form of interior or exterior grooves or depressed surfaces that may be easily formed in the core pieces while also facilitating ease of assembly of the inductor components.

22 Claims, 32 Drawing Sheets

(56) References Cited

U.S. PATENT DOCUMENTS

| | | | |
|---|---|---|---|
| 9,859,043 | B2 | 1/2018 | Yan |
| 9,870,856 | B2 | 1/2018 | Krishnamoorthy |
| 9,978,508 | B2 | 5/2018 | Yan |
| 10,020,110 | B2 | 7/2018 | Hanley |
| 10,224,140 | B2 | 3/2019 | Janis |
| 11,017,939 | B2 | 5/2021 | Krishnamoorthy |
| 2008/0310051 | A1 | 12/2008 | Yan |
| 2010/0007451 | A1 | 1/2010 | Yan |
| 2010/0007453 | A1 | 1/2010 | Yan |
| 2010/0007457 | A1 | 1/2010 | Yan |
| 2010/0013587 | A1 | 1/2010 | Yan |
| 2010/0026443 | A1 | 2/2010 | Yan |
| 2010/0039200 | A1 | 2/2010 | Yan |
| 2010/0085139 | A1 | 4/2010 | Yan |
| 2010/0171579 | A1 | 7/2010 | Yan |
| 2010/0253456 | A1 | 10/2010 | Yan |
| 2010/0259351 | A1 | 10/2010 | Bogert |
| 2010/0259352 | A1 | 10/2010 | Yan |
| 2010/0271161 | A1 | 10/2010 | Yan |
| 2010/0271162 | A1 | 10/2010 | Yan |
| 2010/0277267 | A1 | 11/2010 | Bogert |
| 2013/0021128 | A1 | 1/2013 | Yan |
| 2013/0027169 | A1 | 1/2013 | Yan |
| 2013/0099886 | A1 | 4/2013 | Yan |
| 2013/0113591 | A1 | 5/2013 | Yan |
| 2013/0113592 | A1 | 5/2013 | Yan |
| 2014/0266539 | A1 | 9/2014 | Krishnamoorthy |
| 2014/0266555 | A1 | 9/2014 | Krishnamoorthy |
| 2015/0009004 | A1 | 1/2015 | Zhou |
| 2016/0005528 | A1 | 1/2016 | Yan |
| 2016/0027575 | A1 | 1/2016 | Yan |
| 2016/0260536 | A1 | 9/2016 | Hanley |
| 2016/0276087 | A1 | 9/2016 | Yan |
| 2017/0178784 | A1 | 6/2017 | Janis |
| 2017/0178794 | A1 * | 6/2017 | Yan ......................... H01F 41/02 |
| 2018/0301276 | A1 * | 10/2018 | Yeh ....................... H01F 27/292 |
| 2019/0295765 | A1 | 9/2019 | Yan |
| 2020/0043643 | A1 | 2/2020 | Yan |
| 2021/0125773 | A1 * | 4/2021 | Yan ......................... H01F 27/24 |
| 2021/0125775 | A1 | 4/2021 | Yan |
| 2021/0272745 | A1 * | 9/2021 | Wang .................. H01F 27/2852 |
| 2021/0407729 | A1 | 12/2021 | Yan |

* cited by examiner

INTEGRATED BOTTOM SUNKEN SURFACE MOUNT AND/OR SWING INDUCTOR AND FABRICATION METHODS

TECHNICAL FIELD

The field of the invention relates generally to surface mount electromagnetic component assemblies and methods of manufacturing the same, and more specifically to high current bottom sunken surface mount components and methods of manufacturing the same.

BACKGROUND

Electromagnetic inductor components are known that utilize electric current and magnetic fields to provide a desired effect in an electrical circuit. Current flow through a conductor in the inductor component generates a magnetic field that can be concentrated in a magnetic core. The magnetic field can, in turn, store energy and release energy, cancel undesirable signal components and noise in power lines and signal lines of electrical and electronic devices, or otherwise filter a signal to provide a desired output.

Increased power density in circuit board applications has resulted in a further demand for inductor solutions to provide power supplies in reduced package sizes with desired performance. Conventional surface mount inductor solutions, however, are disadvantaged in some aspects and improvements are accordingly desired.

SUMMARY OF PARTICULAR EMBODIMENTS

An inductor assembly for a circuit board, the inductor assembly may comprise a magnetic core structure, a first conductive winding, and a second conductive winding. The magnetic core structure may comprise first and second magnetic core pieces, wherein each of the first and second magnetic core pieces may comprise a top side, a bottom side, a vertical front side, and a vertical rear side comprising a first vertical slot and a second vertical slot extending in spaced apart relation from the first vertical slot. The magnetic core structure may comprise a third magnetic core piece interposed between the vertical rear sides of the first magnetic core piece and the second magnetic core piece. The third magnetic core piece may comprise opposing top and bottom sides and opposing vertical sides, wherein a combination of each of the first and second magnetic core pieces and the third magnetic core piece defines coil slots. In some embodiments, the first conductive winding may be assembled to the first magnetic core piece and the third magnetic core piece, and a second conductive winding may be assembled to the second magnetic core piece and the third magnetic core piece, each of the first and second conductive windings comprises a top section and first and second leg sections each extending perpendicular to the top section.

In some embodiments, each of the first and second leg sections of each of the first and second conductive windings may comprise a surface mount termination located at a bottom section of that leg section, wherein when the first, second, and third magnetic core pieces may be combined with the first and second conductive windings to form the inductor assembly, the surface mount terminations of the first and second leg sections protrude downward relative to the bottom sides of the first, second, and third magnetic core pieces to from a space between the inductor assembly and the circuit board.

In some embodiments, the first conductive winding may be molded to the first magnetic core piece and the third magnetic core piece, and the second conductive winding may be molded to the second magnetic core piece and the third magnetic core piece.

In some embodiments, the first and second magnetic core pieces may be formed and arranged as mirror images of one another. In some embodiments, the third magnetic core piece may be differently shaped from the first and second magnetic core pieces. In some embodiments, each of the opposing vertical sides may comprise a third vertical slot and a fourth vertical slot, wherein the first and second vertical slots on the vertical rear side of each of the first and second magnetic core pieces align with the third and fourth vertical slots on each of the opposing sides of the third magnetic core piece respectively. In some embodiments, the combination of each of the first and second magnetic core pieces and the third magnetic core piece may further define a recessed top surface In some embodiments, the first and second leg sections each may extend perpendicular to the top section at each opposing end edge of the top section, wherein the top sections of each respective first and second conductive windings may be respectively received in the recessed top surface of the magnetic core structure, wherein the first and second legs sections of each respective first and second conductive windings may be respectively received in the coil slots of the magnetic core structure. In some embodiments, the surface mount termination may be configured to increase a width of a bottom end of each of the conductive windings.

In some embodiments, the first vertical slot and the second vertical slot may be parallel and may be spaced from side edges of the first and second magnet core pieces that interconnect the vertical front side and the vertical rear side. In some embodiments, the first and second conductive windings may be U-shaped coils. In some embodiments, the each of the first, the second, and the third core pieces may define half of the full slot. In some embodiments, the bottom sides of the first, the second and the third magnetic core pieces may be flat and may extend coplanar to one another in a spaced apart and may be parallel to the plane of the circuit board.

In some embodiments, the vertical rear side of each of the first and the second magnetic core pieces may be gapped from each of the opposing vertical sides of the third magnetic core piece. In some embodiments, the top section of each of the conductive windings comprises an extension may extend to the vertical front side of each of the first and the second magnetic core pieces.

In some embodiments, the surface mount termination may comprise a lateral section extending perpendicularly to the leg section, and a terminal section that extends perpendicularly to the lateral section and to the circuit board. The terminal section may further comprise a terminal extension extending toward the vertical front side but not reaching the vertical front side of each of the first and second magnetic core pieces.

In some embodiments, the first, second, or third magnetic core pieces may comprise one or more cutouts on a surface to define an inductance profile of that magnetic core piece, each of the one or more cutouts may define a first cross-sectional area different from a second cross sectional area of another portion of the surface without the cutout.

In some embodiments, the one or more cutouts comprise one or more exterior grooves extending vertically in a spaced apart on the vertical front side from the top side to the bottom side of each of the magnetic core pieces. In some embodiments, the one or more cutouts may comprise an interior groove may extend horizontally across the vertical rear side between side edges of each of the magnetic core pieces. In some embodiments, the one or more cutouts may comprise a depressed planar surface extending vertically across the vertical rear side between the vertical slots of each of the magnetic core pieces from the top side to the bottom side. In some embodiments, the depressed planar surface may extend in a recessed manner on the vertical rear side of each of the magnetic core pieces. In some embodiments, the depressed planar surface may have a cutout depth less than a slot depth of the first vertical slot and the second vertical slot.

BRIEF DESCRIPTION OF THE DRAWINGS

Non-limiting and non-exhaustive embodiments are described with reference to the following FIGS., wherein like reference numerals refer to like parts throughout the various drawings unless otherwise specified.

DESCRIPTION OF EXAMPLE EMBODIMENTS

Figure 1:
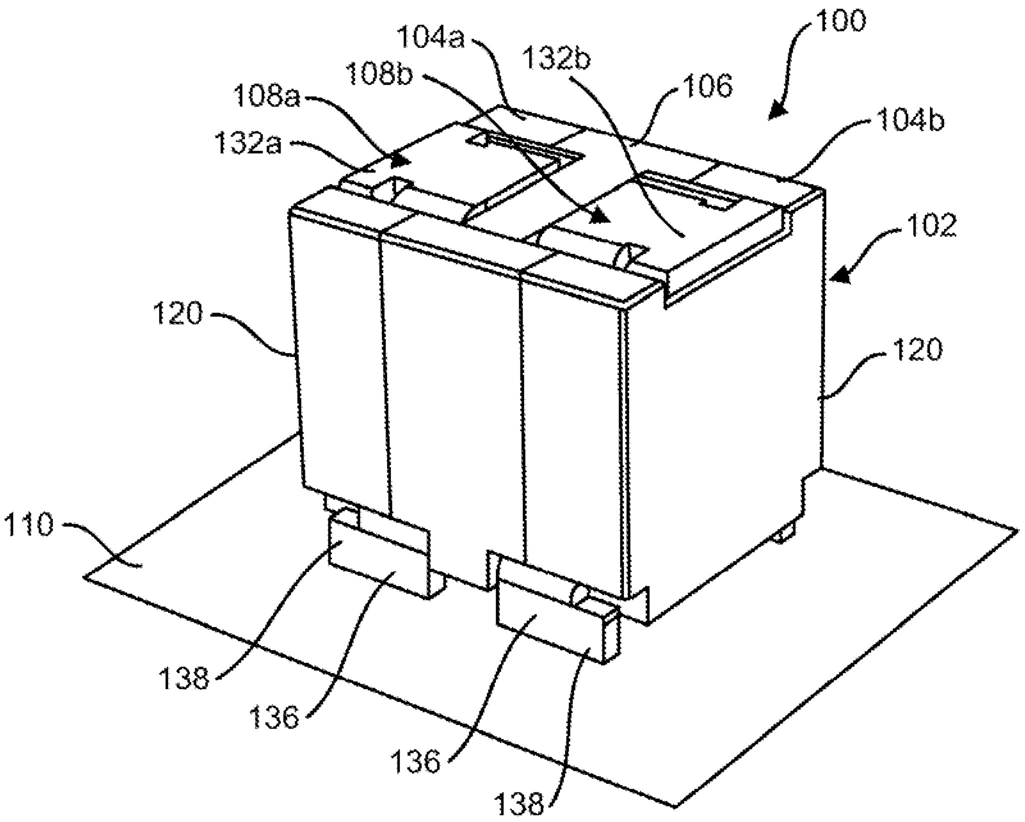
FIG. 1 is a perspective view of a first exemplary embodiment of a bottom sunken surface mount inductor component in accordance with the present invention.

State of the art telecommunications and computing (e.g., data center, cloud) applications require ever more powerful and high-performance power supplies. In the case of medium and low power supplies (below 40 amps), a single-phase power supply architecture is adequate. However, with the latest processors, field programmable gate arrays (FPGAs), application specific integrated circuits (ASICs), and cloud computing systems, higher levels of power and greater performance are in demand. New power supply modules for high-current computing applications such as servers and the like are therefore needed.

In order to achieve new and higher thresholds of power delivery, multiphase power supply architectures are desired. Multiphase power supplies can be designed to be much more efficient than single-phase supplies at higher power levels, and the architecture also allows for more operational flexibility. Such flexibility could also include turning off some of the phases when they aren't needed to deliver the required power, and redundancy if failures occur in certain portions of the power supply system. Multiphase power supplies, however, require much more complex design strategies. Importantly, the increased complexity falls largely on the magnetic components of the power supplies. Innovative integrated inductor design is needed for both non-coupled and coupled inductors to address these challenges and enable a new standard in high-performance power supplies for modern use cases.

For surface mount inductor component manufacturers, the challenge has been to provide inductor components so as to minimize the area occupied on a circuit board by the inductor component (sometimes referred to as the component "footprint") and/or to minimize the component height measured in a direction perpendicular to a plane of the circuit board (sometimes referred to as the component "profile"). By decreasing the footprint and profile of inductor components, the size of the circuit board assemblies for electronic devices can be reduced and/or the component density on the circuit board(s) can be increased, which allows for reductions in size of the electronic device itself or increased capabilities of a device with a comparable size. Miniaturizing electronic components in a cost-effective manner has, however, introduced a number of practical challenges to electronic component manufacturers in a highly competitive marketplace. Because of the high volume of inductor components needed for electronic devices in great demand, cost reduction in fabricating inductor components, without sacrificing performance has been of great practical interest to electronic component manufacturers.

In general, each generation of electronic devices needs to be not only smaller, but offer increased functional features and capabilities. As a result, the electronic devices must be increasingly powerful devices. For some types of components, such as electromagnetic inductor components that, among other things, may provide energy storage and regulation capabilities, meeting increased power demands while continuing to reduce the size of inductor components that are already quite small, has proven challenging as a general proposition, and especially challenging for certain applications.

Multiple phase paralleled buck converters are widely utilized in power supply applications to manage higher current applications and provide enhanced capabilities and functions. A multiphase buck converter can more efficiently handle higher power than a single-phase buck converter of equivalent power output specification, imposing new demands for integrated multi-phase non-coupled and coupled inductors for power supply converter applications in telecommunications and computing applications due to their space saving advantages on a circuit board.

In some cases, the integrated multi-phase inductor components desirably operate with low inductance and high inductance for fast load transient response, high DC bias current resistance, and high efficiency individually. With continuous inductor size reduction, it is more and more challenging to achieve both high initial inductance and high DC bias current resistance together with conventional single step inductance drop characteristics.

Swing-type inductor components are known that are self-adjustable to achieve optimal trade-off between transient performance, DC bias current resistance and efficiency in power converter applications. Unlike other types of inductor components wherein the inductance of the component is generally fixed or constant despite the current load, swing-type inductor operate with an inductance that varies with the current load. Specifically, the swing-type inductor component may include a core that can be operated almost at magnetic saturation under certain current loads. The inductance of a swing core is at its maximum for a range of relatively small currents, and the inductance changes or swings to a lower value for another range of relatively higher currents. Swing-type inductors and their multiple step inductance rolloff characteristics can avoid the limitations of other types of inductor components in power converter applications, but are difficult to economically manufacture in desired footprints while still delivering desired performance. Improvements in swing-type inductor components are accordingly desired.

In certain installations, so-called bottom sunken surface mount inductor components are desired in which room is provided beneath the inductor component to accommodate a mounting of a separately provided component on a circuit board with the inductor component extending over the top of the separately provided component in a vertically stacked arrangement. Meeting such desires in higher current circuitry presents further challenges in the design of the inductor component to achieve the desired performance in the desired package size with acceptable performance. Improvements are accordingly desired.

Exemplary embodiments of integrated bottom sunken surface mount inductor components are described hereinbelow that may more capably perform in higher current, higher power circuitry than conventional inductor components now in use. Integrated multi-phase inductor component assemblies are further manufacturable at relatively low cost and with simplified fabrication processes and techniques. Further miniaturization of the exemplary embodiments of integrated multi-phase inductor is also facilitated to provide surface mount inductor components with smaller package size, yet improved capabilities in high current applications. Bottom sunken features are economically provided, and swing inductor functionality is also realized, with relatively simply shaped core pieces and coils that facilitate economic al manufacturing. Method aspects may be in part explicitly discussed and in part apparent from the following description.

Referring to FIGS. 1-5, a first exemplary embodiment of a bottom sunken surface mount inductor component 100 in accordance with the present invention is shown. The inductor component 100 may comprise a magnetic core structure 102 fabricated in three discrete core pieces **104*a*, 104*b*, and 106 that in combination receive and contain a pair of conductive coils 108*a* and 108*b* that may be surface mounted to a circuit board 110. The circuit board 110 and the inductor component 100 may define a portion of power supply circuitry included in an electronic device. In a contemplated embodiment, the power supply circuitry on the circuit board 110 may implement a multiphase power supply architecture including a multiphase buck converter connected to the coils 108*a*, 108*b* of the inductor component 100** in, for example, a high current computing application.

In a contemplated embodiment, the inductor component 100 may be connected through the circuit board 110 to one of the phases of the multiphase buck converter. Additional inductor components 100 may be provided as discrete components from the inductor component 100 on the board 110 and may respectively connect to the other phases of the multiphase buck converter, with each inductor component 100 on the circuit board 110 being independently operable from the other inductor components 100. As multiphase power supply architecture and multiphase buck converters are known and within the purview of those in the art, further description thereof is omitted herein. The multiphase buck converter power supply application is, however, described for the sake of illustration rather than limitation, and other power supply applications are possible whether or not they relate to power supplies including buck converters.

The magnetic core pieces **104*a*, 104*b* may be similarly sized and shaped core pieces having a front side 120 and a rear side 122. The front side 120 may be flat and smooth while the rear side 122 maybe formed with spaced apart, generally parallel and vertically extending coil slots 124***a*, 124*b*. The coil slots 124*a*, 124*b* may be spaced from the respective side edges of the core pieces 104*a*, 104*b* that interconnect the front and rear sides 120, 122 as shown.

The magnetic core piece 106, unlike the core pieces 104*a* and 104*b*, may comprise opposing sides 126*a*, 126*b* that each include a pair of spaced apart, generally parallel and vertically extending coil slots 128*a*, 128*b*. As such, the core piece 106 may comprise four coil slots while the core pieces 104*a*, 104*b* may comprise two coil slots piece. The coil slots 128*a*, 128*b* in magnetic core piece 106 are also spaced from the respective side edges of the core piece 106 that interconnect the opposing sides 126*a*, 126*b* as shown.

Figure 3:
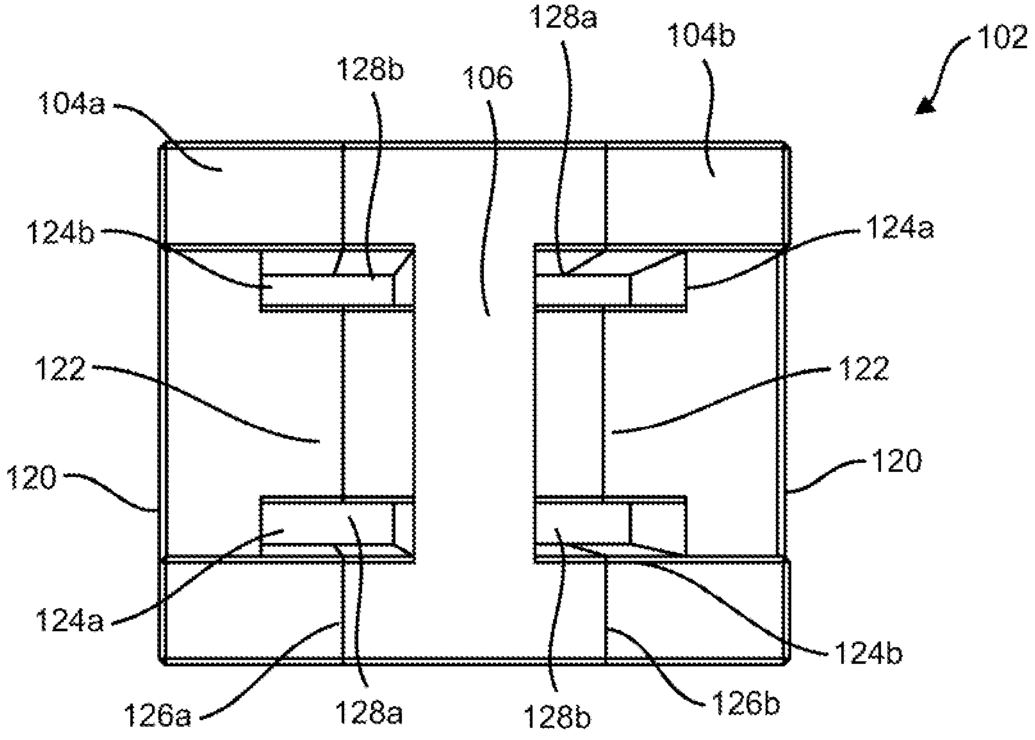
FIG. 3 is a top view of the magnetic core structure for the bottom sunken surface mount inductor component shown in FIGS. 1 and 2.

During assembly of the magnetic core structure 102, the magnetic core pieces 104, 106 may be inverted relative to one another with the core piece 106 in between. That is, the core pieces 104*a*, 104*b* may be rotated 180° relative to one another such that the coil slots 124*a*, 124*b* on the rear side 122 in each core piece 104*a*, 104*b* may align with and face the respective coil slots 128*a*, 128*b* in each side of the core piece 106. As shown in FIG. 3, the assembled core pieces 104*a*, 104*b*, and 106 in combination may define relatively larger coil slots than any of the pieces 104*a*, 104*b*, and 106 may define individually. In the example shown in FIG. 3, each of the adjoining core pieces 104*a*, 106, and 104*b* may define about ½ of the coil slot created in the magnetic core structure 102. Variations are, of course, possible, however.

Figure 2:
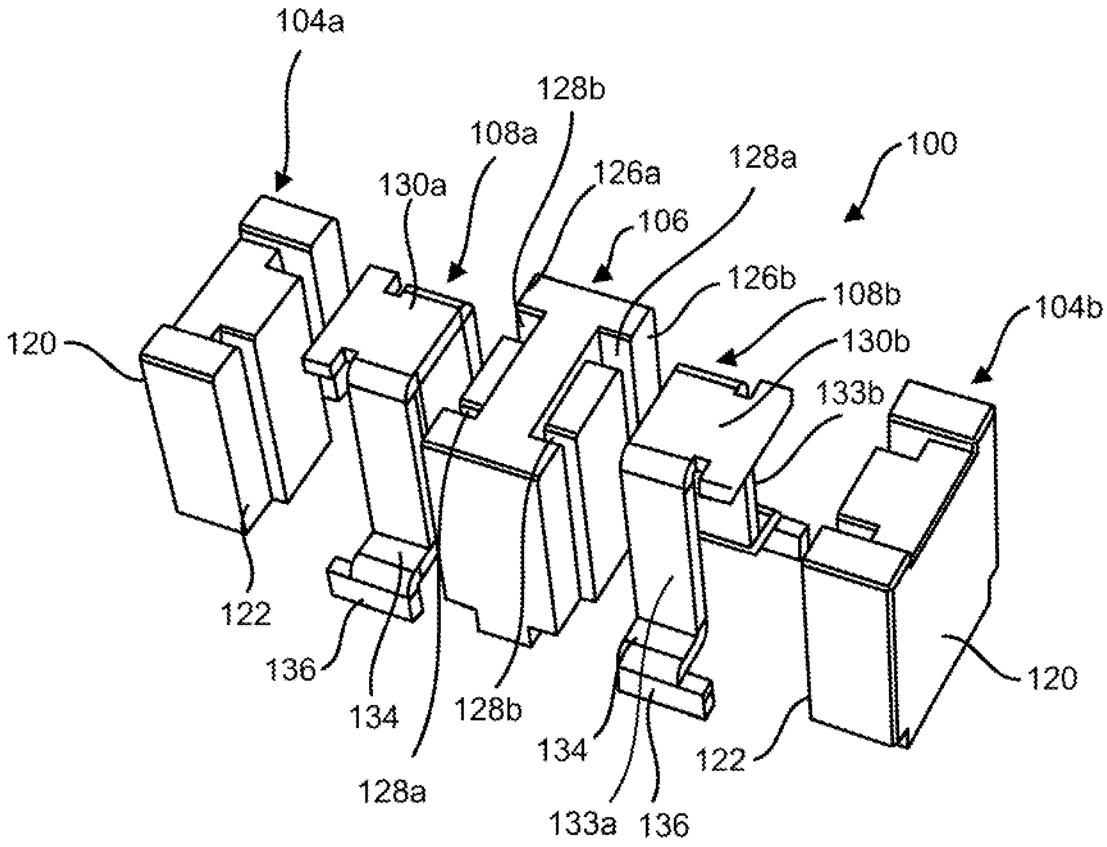
FIG. 2 is an exploded view of the bottom sunken surface mount inductor component shown in FIG. 1.
Figure 4:
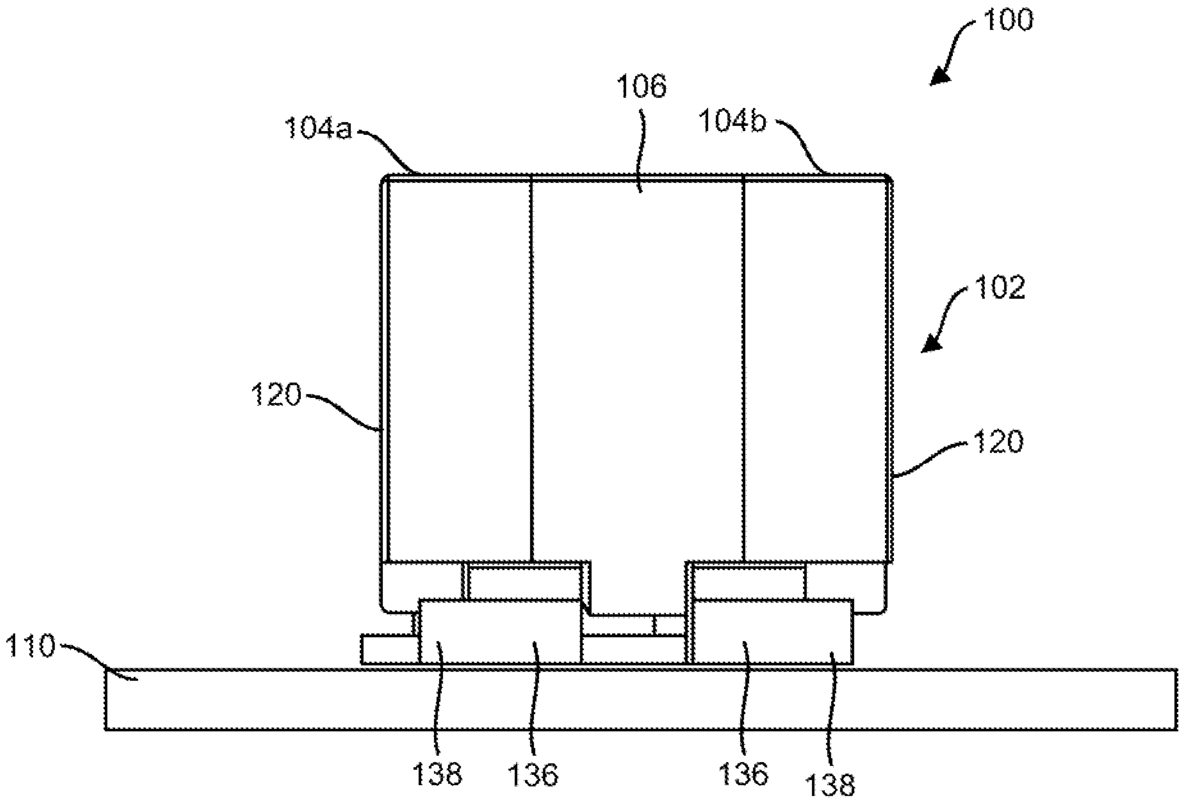
FIG. 4 is a side elevational view of the bottom sunken surface mount inductor component shown in FIGS. 1 and 2.
Figure 5:
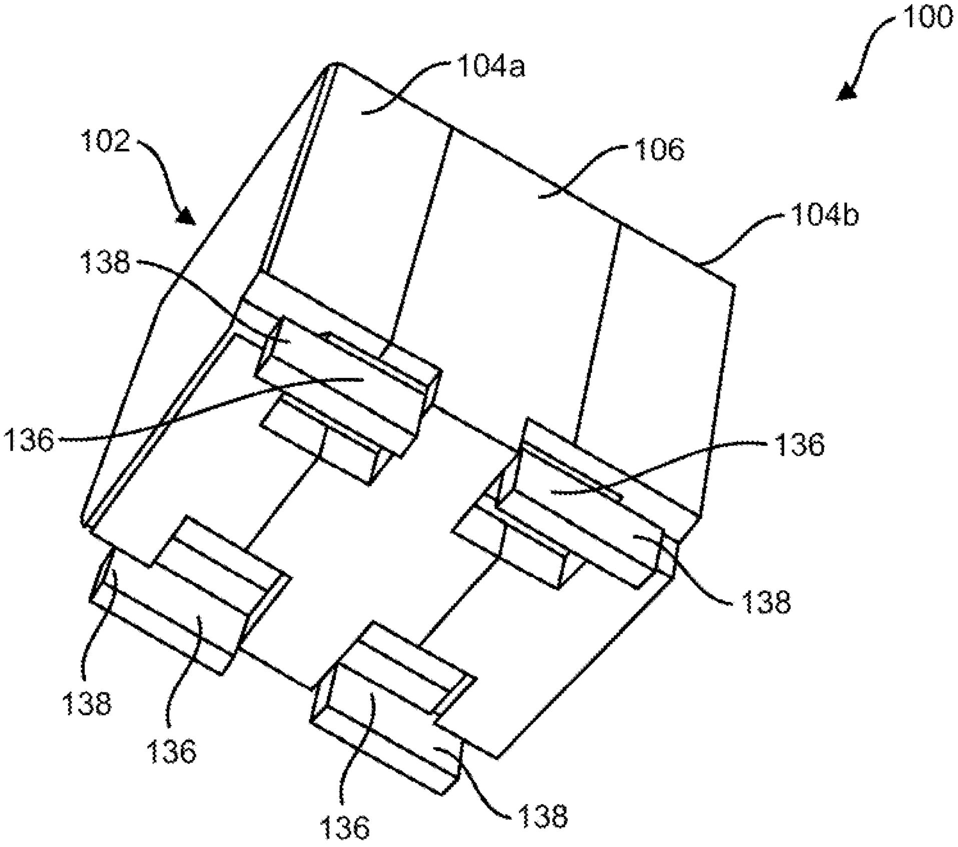
FIG. 5 is a bottom view of the bottom sunken surface mount inductor component shown in FIGS. 1, 2, and 4.
Figure 6:
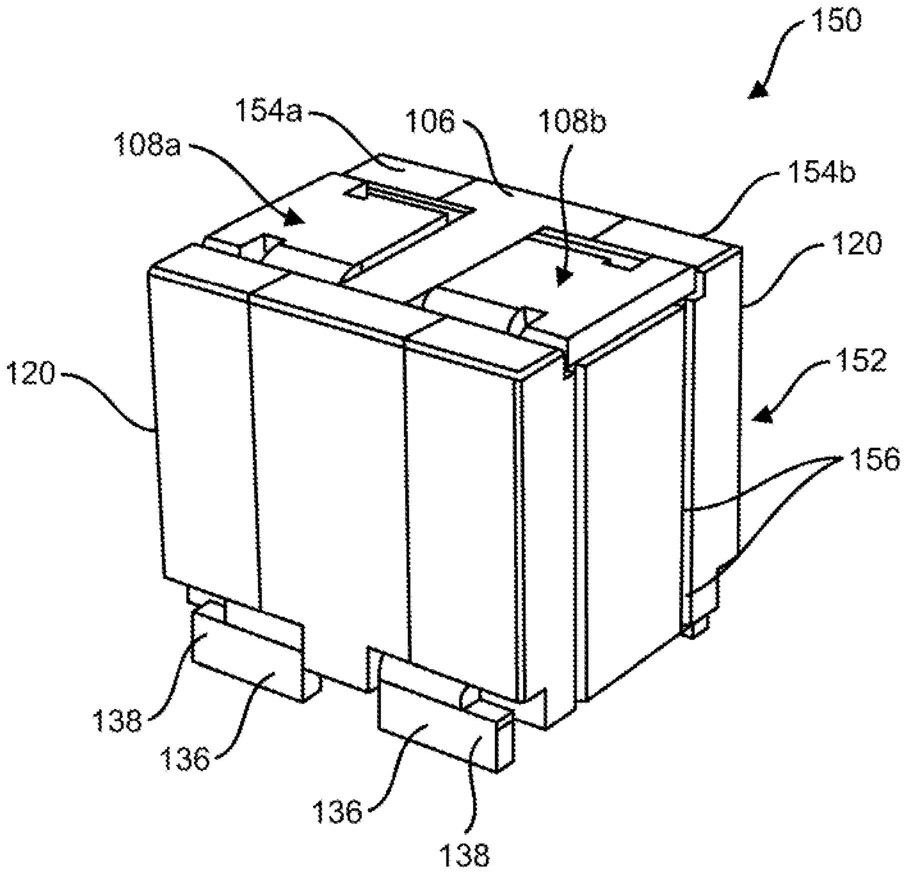
FIG. 6 is a perspective view of a second exemplary embodiment of a bottom sunken surface mount inductor component in accordance with the present invention.

In some embodiments, the core pieces 104*a*, 104*b*, and 106 may share a height dimension measured in the direction perpendicular to the plane of the circuit board 110 (i.e., in the vertical direction shown in FIGS. 1, 2, and 4). Each core piece 104*a*, 104*b*, and 106 may comprise a generally flat bottom surface, with the flat bottom surfaces being generally flush with one another in the magnetic core structure 102. As such, the bottom of the core pieces 104*a*, 104*b* and 106 extend coplanar to one another in a spaced apart but generally parallel to the plane of the circuit board 110 as seen in FIGS. 1 and 4. In some embodiments, the core pieces 104*a*, 104*b*, and 106 may comprise aligned and generally flat top surfaces, with each piece formed with respective depressions to accept a portion of the conductive windings 108*a*, 108*b* as shown on the top side of the core pieces 104*a*, 104*b* and 106. The rear sides 122 of the magnetic core pieces 104*a*, 104*b* may be optionally spaced or gapped from the respective sides 126*a*, 126*b* of the magnetic core piece 106 in the magnetic core structure as needed to realize initial inductance requirements.

The conductive coils 108*a*, 108*b* as shown in FIG. 2 may be inverted U-shaped coils respectively having a top section 130*a*, 130*b* that may extend parallel to the plane of the circuit board 110 in a recessed manner on the top side or upper side of the magnetic core pieces 104*a* or 104*b* and on the core piece 106 at a distance spaced from the plane of the circuit board. As such, the top section 130*a*, 130*b* of each coil 108*a*, 108*b* may be spaced a maximum vertical distance from the circuit board 110 but may be generally flush with the top surface of the magnetic core structure 102. In some embodiments, the top section 130*a*, 130*b* of each coil 108*a*, 108*b* may include an extension 132*a*, 132*b* that extending to the front wall 120 of each core piece 104*a*, 104*b* in the completed assembly. The extensions 132*a*, 132*b* may increase the surface area of the top sections 130*a*, 130*b* of the coils 108*a*, 108*b*. The increased surface on the top sections of the coils 108*a*, 108*b* area beneficially provides an alignment feature that facilitates an easier assembly of the coils 108*a*, 108*b* to the core pieces 104*a*, 104*b*, improves heat dissipation in the operation of the inductor component and a component beneath the inductor component via the bottom sunken feature described below, and increases the cross sectional area to advantageously lower direct current resistance (DCR) of the inductor component 100 in use.

In some embodiments, each coil 108*a*, 108*b* may comprise straight and parallel leg sections each extending perpendicular to the top sections 130*a*, 130*b* at each opposing end edge of the top sections 130*a*, 130*b*. The axial length of each of the leg sections may be greater than the axial length of the top sections 130*a*, 130*b* such that each coil 108*a*, 108*b* as shown is much taller than it is wide. The leg sections may be received in the coil slots of the core pieces 104*a*, 104*b*, and 106 in the assembly of the magnetic core structure 102.

At the bottom side of each of the coil leg sections, opposite to the top sections 130*a*, 130*b*, surface mount terminations may be formed, which may comprise a lateral section 134 extending perpendicularly to the vertically extending leg sections (i.e., horizontally in the assembly as shown in FIG. 2) and a terminal section 136 that extends perpendicularly to the lateral sections and to the circuit board 110 (i.e., vertically in the assembly as shown in FIGS. 1 and 2). In some embodiments, the terminal sections 136 may comprise extensions 138 that extend toward the front side 120 of each core piece 104*a*, 104*b* but that do not reach the front side 120. The extensions 138 may provide an increased surface area on the bottom of the terminals to facilitate surface mounting of the component 100 to the circuit board 110.

The coils 108*a*, 108*b* may be inverted relative to one another in the assembly such that the upper and lower extensions 132*a*, 132*b* and the lower extensions 138 in each coil 108*a*, 108*b* may extend in opposite directions in the assembled component 100. The coils 108*a*, 108*b* may be rotated 180° relative to one another when inter-fitted with the coil slots 124*a*, 124*b* and the coil slots 128*a*, 128*b* in the core pieces 104*a*, 104*b* and 106. The lateral sections 134 in each coil 108*a*, 108*b* may increase the width of the coils 108*a*, 108*b* on their lower ends relative to the vertical leg sections of the inverted U-shaped portion of the coils 108*a*, 108*b*. By virtue of such increased width, the terminals 136 of the coils 108*a*, 108*b* may extend alongside the outer walls of the magnetic core structure 102, and the lower side of the terminals 136 that abut the circuit board 110 may extend at a distance from the bottom surface of the magnetic core structure 102. This terminal configuration may create a space (best seen in FIGS. 1, 4 and 5) between the bottom surface of the magnetic core structure 102 and the circuit board 110 which may accommodate another circuit board component (not shown) beneath the inductor component 100 in a space saving arrangement wherein the other circuit board component is sandwiched between the circuit board 110 and the bottom of the inductor component 100.

Each coil 108*a*, 108*b* may be fabricated from a sheet of conductive material having a uniform thickness that is cut and formed or bent in the particular shape having the particular features shown. The coils 108*a*, 108*b* may be advantageously provided in the shape as shown as a fully preformed element that can be simply assembled with the magnetic core pieces 104*a*, 104*b* and 106 at a separate stage of manufacture without additional forming or shaping of the coil 108 being required.

The magnetic materials used to fabricate each respective core pieces 104*a*, 104*b*, and 106 may be selected from a variety of soft magnetic particle materials known in the art and formed into the illustrated shapes according to known techniques such as molding of granular magnetic particles to produce the desired shapes. Soft magnetic powder particles used to fabricate the magnetic core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, Mn—Zn power ferrite materials, Mn—Zn high permeability ferrite core materials, and other suitable materials known in the art. In some cases, magnetic powder particles may be coated with an insulating material such the magnetic core pieces may possess so-called distributed gap properties familiar to those in the art and fabricated in a known manner. In various embodiments, the magnetic core pieces 104*a*, 104*b* and 106 may be fabricated from the same magnetic material or from different magnetic materials as desired. In contemplated embodiments, however, the inductor component 100 operates with a fixed or constant inductance in a range of currents up to the point where the magnetic core becomes saturated.

Also, in contemplated embodiments, the coils 108*a*, 10*b* may sufficiently spaced apart from one another by the core piece 106 to avoid any magnetic coupling of the coils 108*a*, 108*b*. Depending on the particular application of the inductor component 100, however, in some cases the coils 108*a*, 108*b* may be magnetically coupled to produce desired effects rather than being uncoupled as described above.

As demonstrated in the following exemplary embodiments described below, the benefits of the inductor component 100 can be further enhanced by providing additional features in the magnetic core pieces that define magnetic gaps in the core structure, in addition to and apart from any gaps that may be optionally provided between the adjacent core pieces themselves. The additional magnetic gaps provided by such additional features are located in a flux path produced by current flowing through the coils, and the additional magnetic gaps reduce a cross sectional area of the magnetic core piece to purposely saturate a portion of the magnetic core at a desired current before the rest of the flux path reaches complete magnetic saturation. The additional magnetic gaps, as implemented in the examples described next, beneficially allow a partial saturation of the magnetic core structure to achieve desirable swing inductor effects wherein the magnetic core is operable at more than one inductance value in different ranges of operating currents.

FIGS. 6-9 are various views of a second exemplary embodiment of an inductor component 150 that is similar in many aspects to the inductor component 100, but is further adapted to provide swing-type inductor functionality in an economical manner with ease of assembly and in a desirable package size. The inductor component 150 may be used in addition to or in lieu of the inductor component 100 on the circuit board 110.

Figure 7:
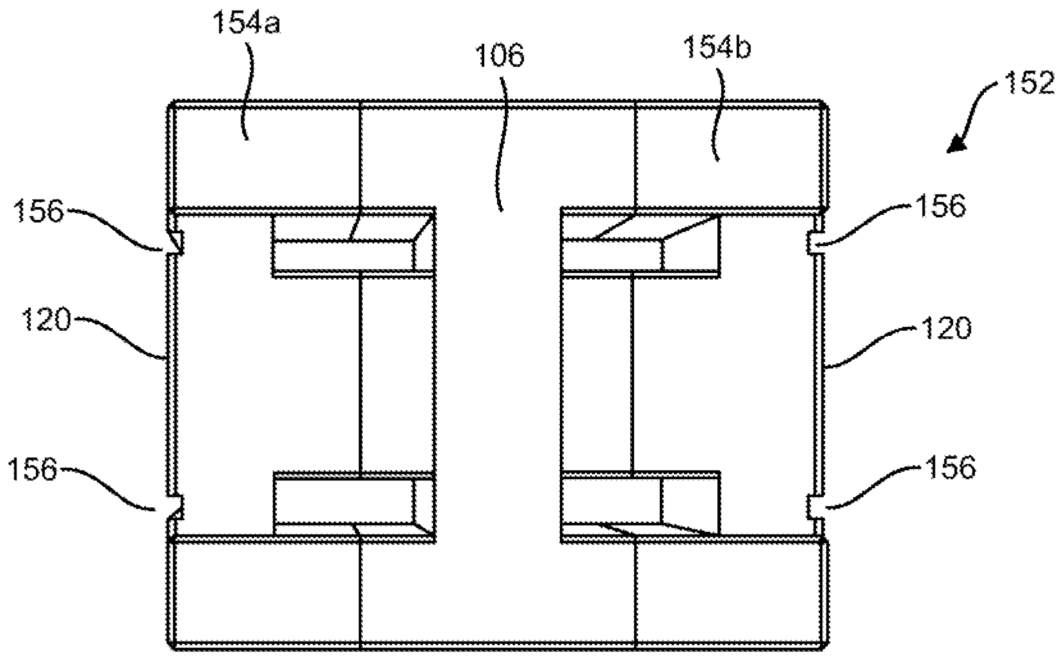
FIG. 7 is a top view of the magnetic core structure for the bottom sunken surface mount inductor component shown in FIG. 6.
Figure 8:
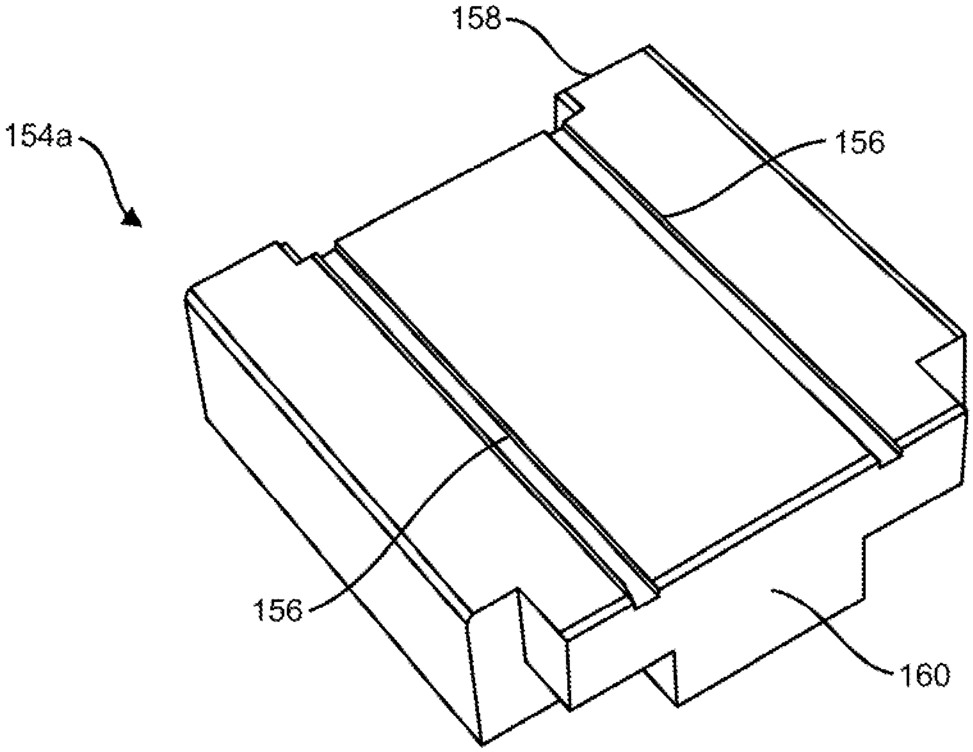
FIG. 8 is a front side view of an exemplary core piece for the bottom sunken surface mount inductor component shown in FIG. 6.
Figure 9:
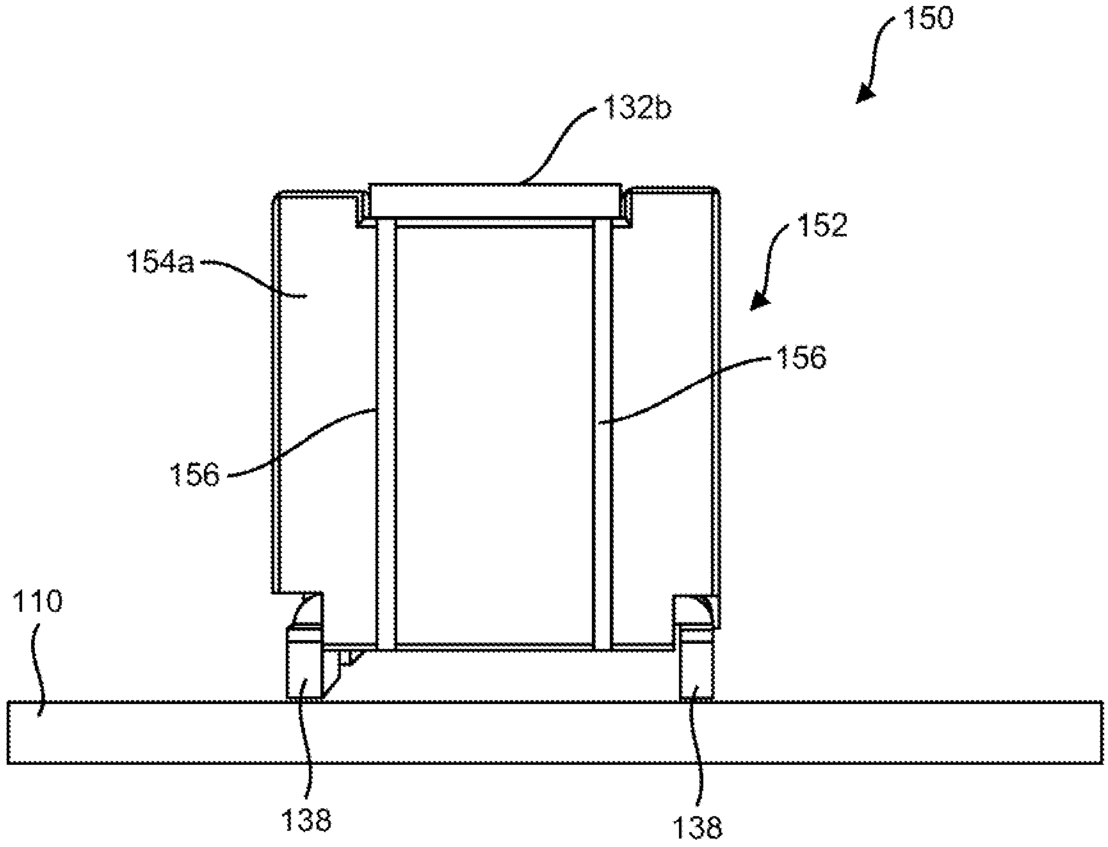
FIG. 9 is a side elevational view of the bottom sunken surface mount inductor component shown in FIG. 6.
Figure 10:
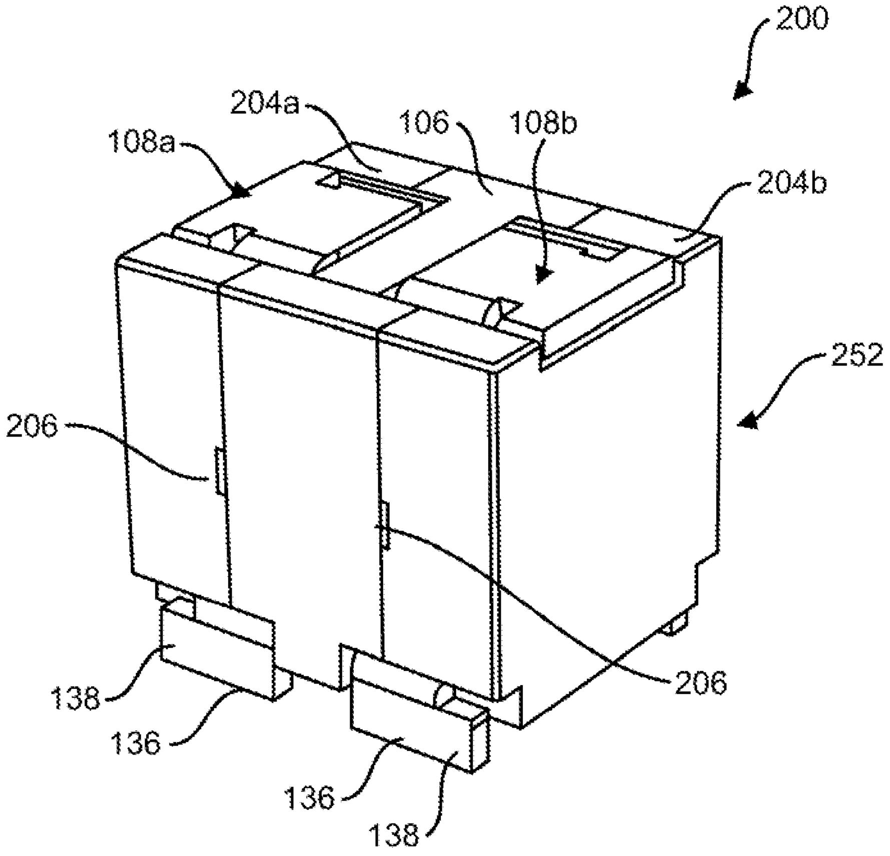
FIG. 10 is a perspective view of a third exemplary embodiment of a bottom sunken surface mount inductor component in accordance with the present invention.
Figure 11:
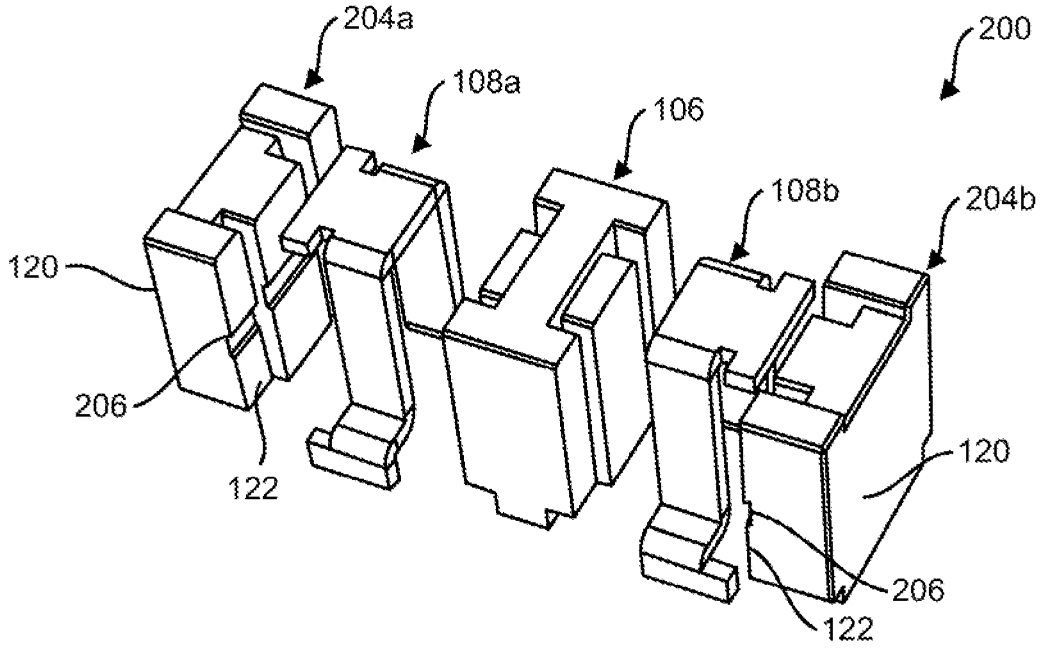
FIG. 11 is an exploded view of the bottom sunken surface mount inductor component shown in FIG. 10.
Figure 12:
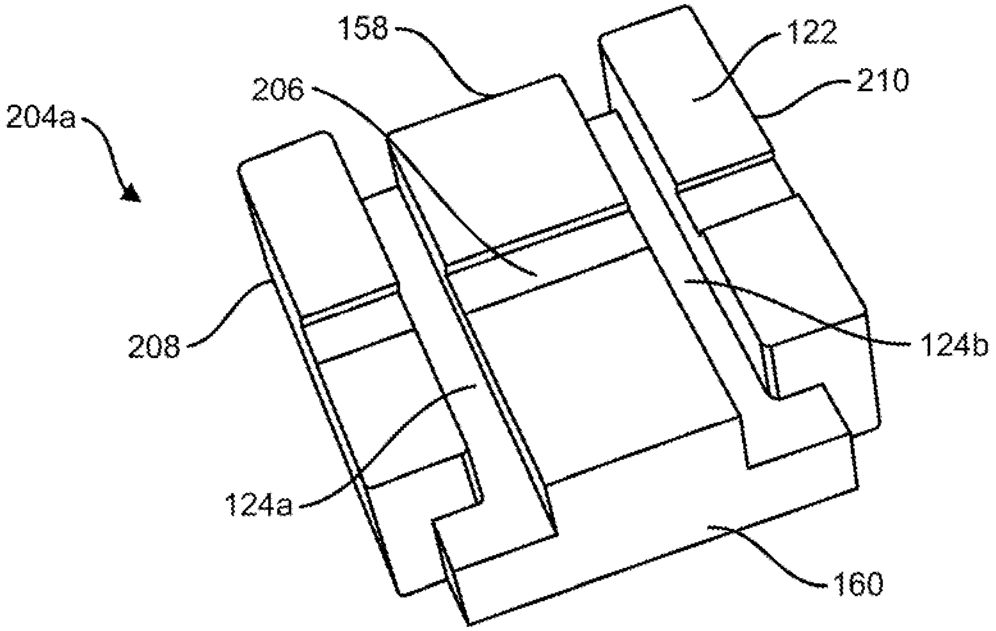
FIG. 12 is a rear side view of a magnetic core piece for the bottom sunken surface mount inductor component shown in FIG. 10.
Figure 13:
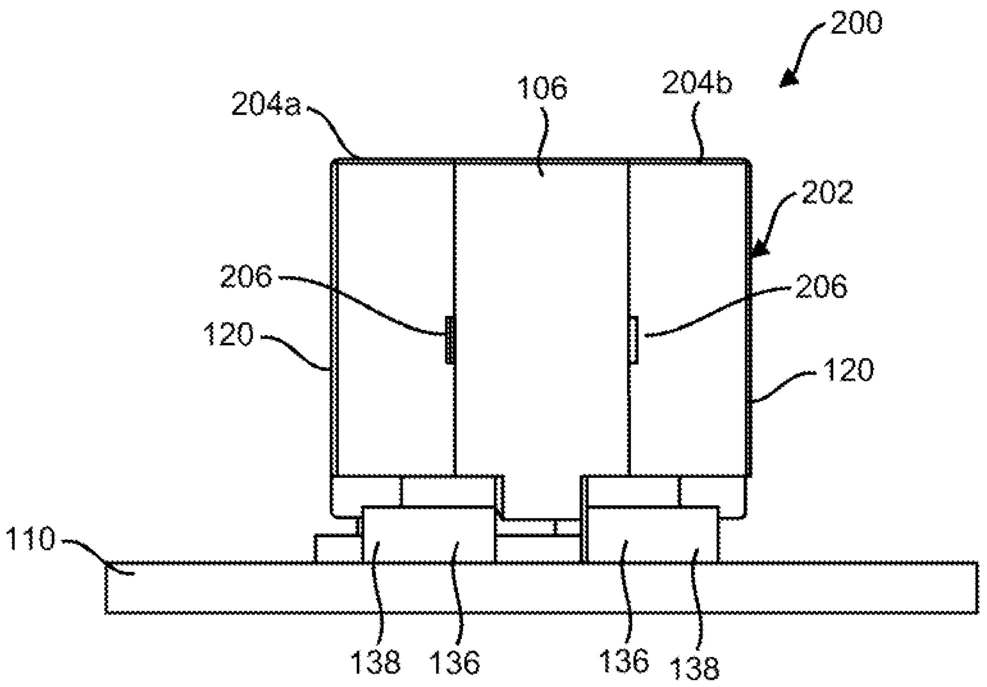
FIG. 13 is a side view of the bottom sunken surface mount inductor component shown in FIG. 10.
Figure 14:
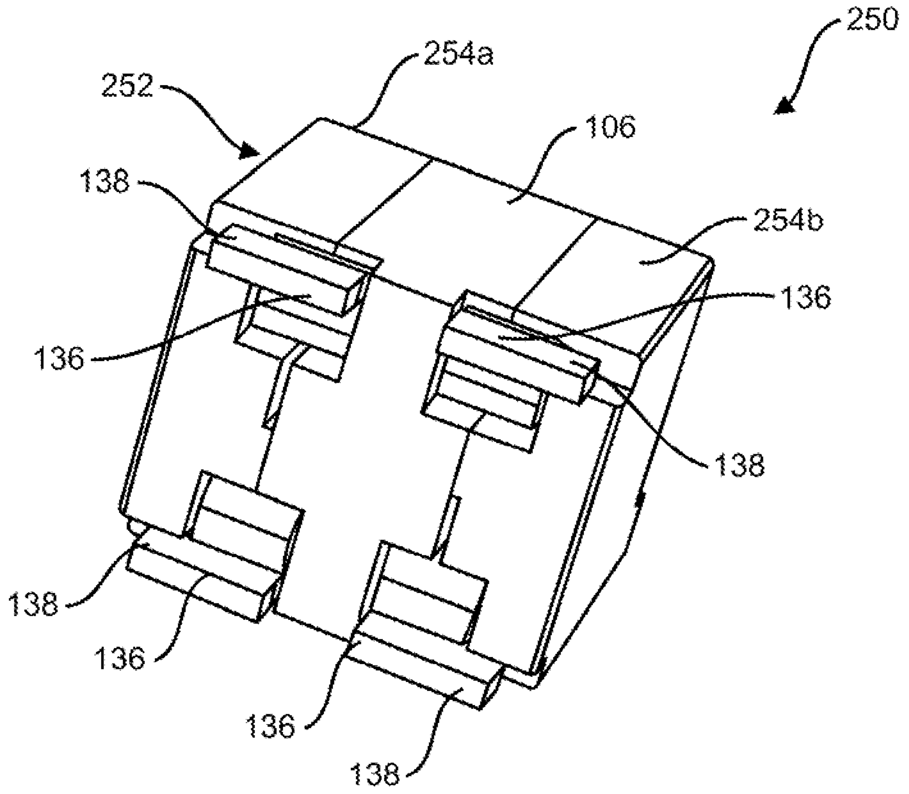
FIG. 14 is a bottom perspective view of a fourth embodiment of a bottom sunken surface mount inductor component.
Figure 15:
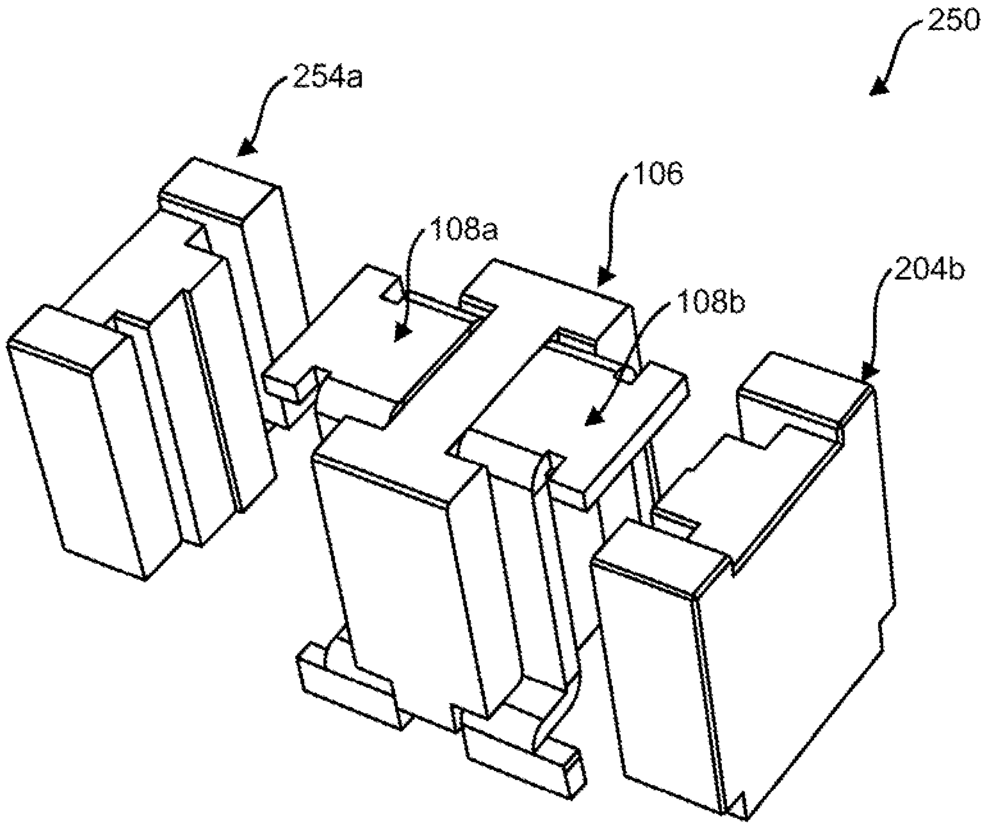
FIG. 15 is an exploded view of the bottom sunken surface mount inductor component shown in FIG. 14.
Figure 16:
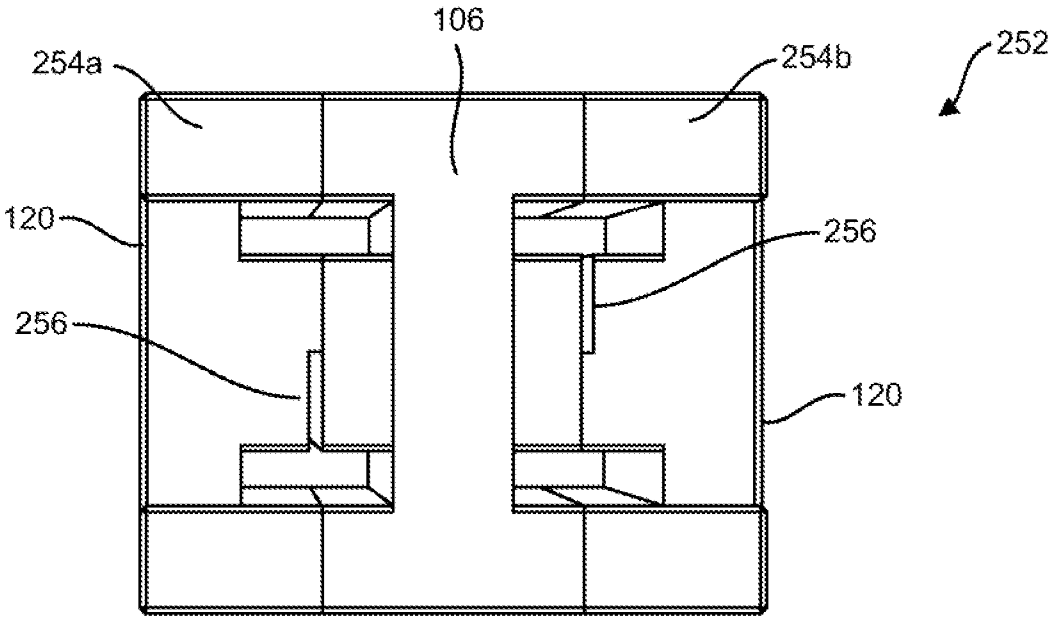
FIG. 16 is a bottom view of the magnetic core structure for the bottom sunken surface mount inductor component shown in FIGS. 14 and 15.
Figure 17:
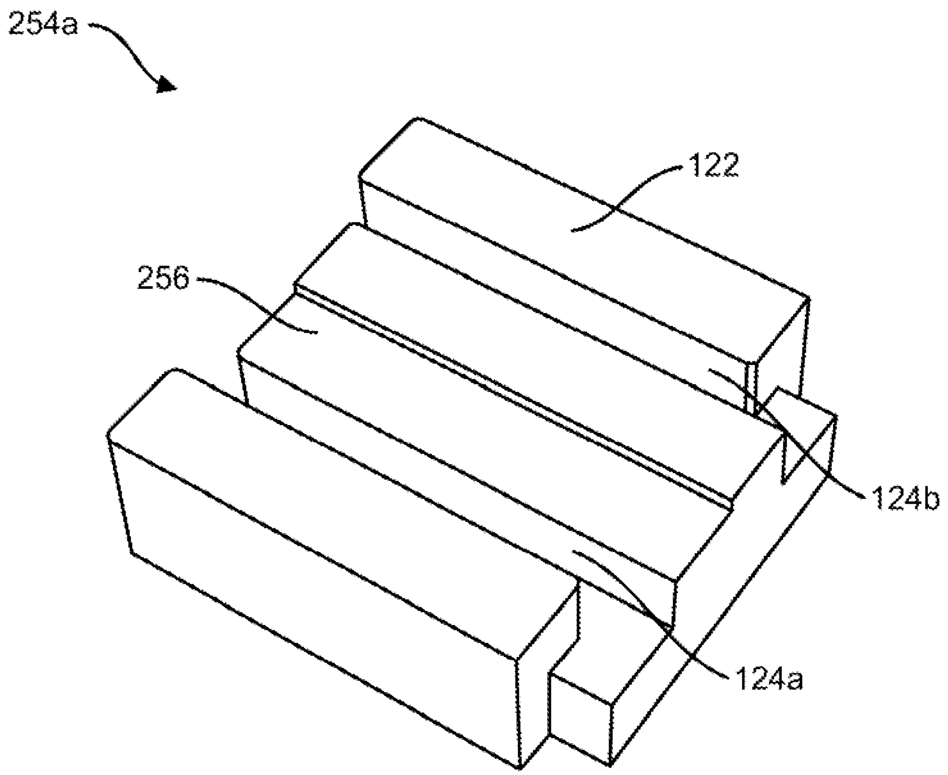
FIG. 17 is a rear side view of a magnetic core piece for the bottom sunken surface mount inductor component shown in FIGS. 14-16.

The inductor component 150 may comprise a magnetic core structure 152 with core pieces 154*a*, 154*b* in lieu of the core pieces 104*a*, 104*b* described above. The core pieces 154*a*, 154*b*, unlike the core pieces 104*a*, 104*b*, may comprise exterior grooves 156 in their front sides 120. Otherwise, the core pieces 154*a*, 154*b* may be similar to the core pieces 104*a*, 104*b* and may be assembled to the coils 108*a*, 108*b* and the core piece 106 in the same manner. The grooves 156 may extend vertically in a spaced apart and generally parallel relationship in the example shown, and may further extend fully from the top surface 158 to the bottom surface 160 of the core pieces 154*a*, 154*b*. As best shown in FIG. 7, the grooves 156 may align with the coil slots in the core pieces 154*a*, 154*b*, and the core piece 106.

Importantly, the grooves 156 may define physical gaps in the magnetic core structure that create localized magnetic gaps in the core structure 152. The physical gaps defined by the grooves 156 may be located to strategically interrupt a flux path of the coils 108*a*, 108*b* in the operation of the inductor component 150 where the localized portion of the magnetic core structure 152 may saturate while the rest of the magnetic core does not. Such interruption of the flux path in localized areas realizes swing-type inductor characteristics wherein the component 150 may operate with an inductance that varies with the current load. Specifically, and by virtue of the gaps formed with the grooves 156, the magnetic core 152 may be operated almost at a maximum level for a range of relatively small currents, and the inductance changes or swings to a lower value for another range of relatively higher currents. The actual high and low inductance values and accompanying low and high current ranges in use may vary depending on the magnetic material utilized to fabricate the core pieces and the specifics of the gaps defined by the grooves (e.g., length width and depth and the location of the groove in the flux path). The shape and geometry of the grooves 156 shown in FIGS. 6-9 are therefore exemplary only, and it is understood that the number and locations of the grooves may vary in different embodiments while still providing desirable swing-type functionality.

FIGS. 10 through 13 are various views of a third exemplary embodiment of an inductor component 200 that is also similar in many aspects to the inductor component 100, but may be adapted to provide swing-type inductor functionality in an economical manner with ease of assembly and in a desirable package size. The inductor component 200 may be used in addition to or in lieu of the inductor components 100 or 150 on the circuit board 110.

The inductor component 200 may comprise a magnetic core structure 202 with core pieces 204*a*, 204*b* in lieu of the core pieces 104*a*, 104*b* described above. The core pieces 204*a*, 204*b*, unlike the core pieces 104*a*, 104*b*, may comprise an interior groove 206 in their respective rear side 122. In some embodiments, the core pieces 204*a*, 204*b* may be similar to the core pieces 104*a*, 104*b* and may be assembled to the coils 108*a*, 108*b* and the core piece 106 in the same manner. In the example shown, the groove 206 in each core piece 204*a*, 204*b* may extend horizontally across the rear side 122 and may extend fully between side edges 208 and 210 of the core pieces 204*a*, 204*b*. The groove 206 in the example shown is about equidistant from the top and bottom surfaces 158 and 160, although it alternatively may be located closer to one of the top and bottom surfaces 158 and 160. In some embodiments, the groove 206 may extend on both sides and in between the clip channels 124*a*, 124*b* formed in each core piece 204*a*, 204*b* in the example shown. In some embodiments, the groove 206 may be located in between the clip channels 124*a*, 124*b* or on the side of the clip channels 124*a*, 124*b* but not in between. Numerous variations are possible in this regard.

Importantly, the grooves 206 in each core piece 204*a*, 204*b* may define localized physical gaps in the interior of the magnetic core structure 202 that in turn create magnetic gaps in the core structure 202 where the localized portion of the magnetic core structure 202 can saturate while the rest of the magnetic core does not. The physical gaps defined by the grooves 206 may be located to strategically interrupt a flux path of the coils 108*a*, 108*b* in the operation of the inductor component 200. Such interruption of the flux path may realize swing-type inductor characteristics wherein the component 200 operates with an inductance that varies with the current load. Specifically, and by virtue of the gaps formed with the grooves 206, the magnetic core 200 can be operated at a maximum level for a range of relatively small currents, and the inductance changes or swings to a lower value for another range of relatively higher currents. The actual high and low inductance values and accompanying low and high current ranges in use may vary depending on the magnetic material utilized to fabricate the core pieces and the specifics of the gaps defined by the groove (e.g., length width and depth and the location of the groove in the flux path). The grooves 206 shown in FIGS. 10-13 are therefore exemplary only, and it is understood that the number and locations of the grooves may vary in different embodiments while still providing desirable swing-type functionality.

FIGS. 14-17 are various views of a third exemplary embodiment of an inductor component 250 that is also similar in many aspects to the component 100, but is adapted to provide swing-type inductor functionality in an economical manner with ease of assembly and in a desirable package size. The inductor component 250 may be used in addition to or in lieu of the inductor components 100, 150 or 200 on the circuit board 110.

The inductor component 250 may comprise a magnetic core structure 252 with core pieces 254*a*, 254*b* in lieu of the core pieces 104*a*, 104*b* described above. The core pieces 254*a*, 254*b*, unlike the core pieces 104*a*, 104*b*, may comprise a depressed surface 256 on their respective rear sides 122. The depressed surface 256 in each core piece 254*a*, 254*b* may be generally planar and may extend in a recessed manner on the rear sides 122, but has a depth that is less than depth of the coil slots 124*a*, 124*b*. Otherwise, the core pieces 204*a*, 204*b* may be similar to the core pieces 104*a*, 104*b* and may be assembled to the coils 108*a*, 108*b* and the core piece 106 in the same manner. The depressed surface 256 in each core piece 204*a*, 204*b* may extend vertically across the rear side 122 and may extend between the clip channels 124*a*, 124*b* of the core pieces 254*a*, 254*b* and extends fully between the top and bottom surfaces 158 and 160 of each core piece, although a depressed surface may be located elsewhere and may extend only partly across the core pieces in another embodiment. Numerous variations are possible in this regard.

Importantly, the depressed surface 256 in each core piece 254*a*, 254*b* may define localized physical gaps in the interior of the magnetic core structure 252 that in turn create magnetic gaps in the core structure 252 where the localized portion of the magnetic core structure 252 can saturate while the rest of the magnetic core does not. The physical gaps defined by the depressed surfaces 256 may be located to strategically interrupt a flux path of the coils 108*a*, 108*b* in the operation of the inductor component 250. Such interruption of the flux path realizes swing-type inductor characteristics wherein the component 250 operates with an inductance that varies with the current load. Specifically, and by virtue of the gaps formed with the depressed surfaces 256, the magnetic core 250 can be operated at a maximum level for a range of relatively small currents, and the inductance changes or swings to a lower value for another range of relatively higher currents. The actual high and low inductance values and accompanying low and high current ranges in use may vary depending on the magnetic material utilized to fabricate the core pieces and the specifics of the gaps defined by the depressed surface (e.g., length width and depth and the location of the depressed surface 256 in the flux path). The depressed surfaces 256 shown in FIGS. 14-17 are therefore exemplary only, and it is understood that the number and locations of the depressed surfaces may vary in different embodiments while still providing desirable swing-type functionality.

Figure 18:
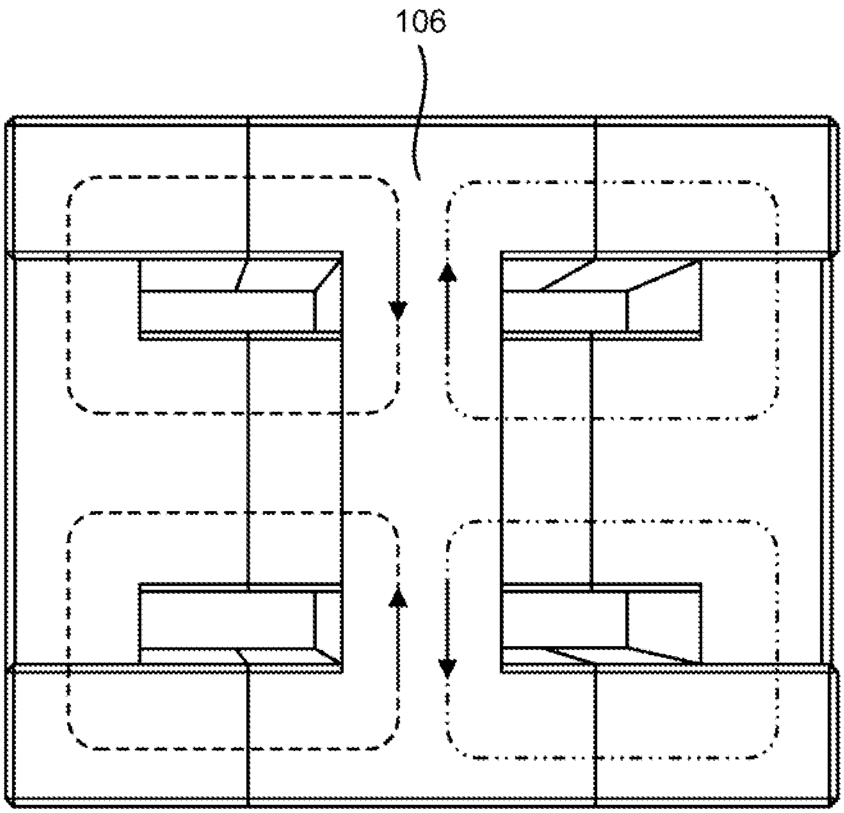
FIG. 18 illustrates flux paths in an operating inductor component having the magnetic core shown.

FIG. 18 illustrates flux paths generated by the leg sections of the coils 108*a*, 108*b* in a magnetic core structure similar to those described above for the components 100, 150, 200 and 250. The flux paths are shown in dotted lines with directional arrows to illustrate the operation of the magnetic core structure in use.

The flux paths on the left side of the magnetic core structure shown in FIG. 18 may extend around the coil slots on the left side and are produced by the coil 108*a*. The flux paths are seen to extend in opposite directions due to the current flowing through each leg of the coil 108*a* in different directions.

The flux paths on the right side of the magnetic core structure in FIG. 18 may extend around the coil slots on the right side and are produced by the coil 108*b*. The flux paths are seen to extend in opposite directions due to the current flowing through each leg of the coil 108*b* in different directions.

The flux paths on the top side of magnetic core structure in FIG. 18 extend around the top coil slots in different directions as shown, and the flux paths on the bottom side of the magnetic core structure also extend around the top coil slots in different directions as shown.

The adjacent sides of the magnetic core pieces in the magnetic core structure may or may not be gapped from one another depending on the initial inductance required for the end use application of the inductor component. Additional magnetic gaps such as those described above may be defined via the core pieces described above in the inductor components 150, 200 and 250 to provide desired swing inductor characteristics in addition to the desired initial inductance of the components.

In the absence of an additional magnetic gap in the core structure (e.g., the magnetic core structure 102) the inductor component may be operable with a fixed inductance across a single range of currents until the magnetic core reaches saturation. When additional localized magnetic gaps are strategically present (e.g., the localized gaps in the magnetic core structures 152, 202, 252), which may be established with an exterior or interior groove or a depressed surface as described above which facilitates a partial saturation of the magnetic core in localized areas of the magnetic core structure, the additional magnetic gaps realize a different magnetic reluctance along the flux paths at different load currents and therefore imparts the type of swing inductor functionality described above. The localized magnetic gaps may be located anywhere in the flux path to help achieve swing inductor effects as long as the gaps are not located along a shared flux path for the respective flux paths present.

For example, in the magnetic core structure shown in FIG. 18, the center portion of the magnetic core piece 106 may represent a shared flux path for the flux paths around the coil slots on the top side and the coil slots on the bottom side, respectively. Such magnetic gaps should therefore not be created in such center portions of the core piece 106, but in principle could be located anywhere else in the middle core piece 106 or the other core pieces on each side of the core piece 106 as described above for the components 150, 200 and 250. As illustrated in the components 150, 200 and 250 the magnetic gaps may be created on the interior or exterior of the core structure, may extend vertically or horizontally, and may appear on different sides or surfaces of the magnetic core structure. The magnetic gaps producing the swing inductor effect may be provided only in the outside core pieces, only in the middle core piece, or in all three core pieces in the magnetic structures described above producing similar effects to different degrees.

Figure 19:
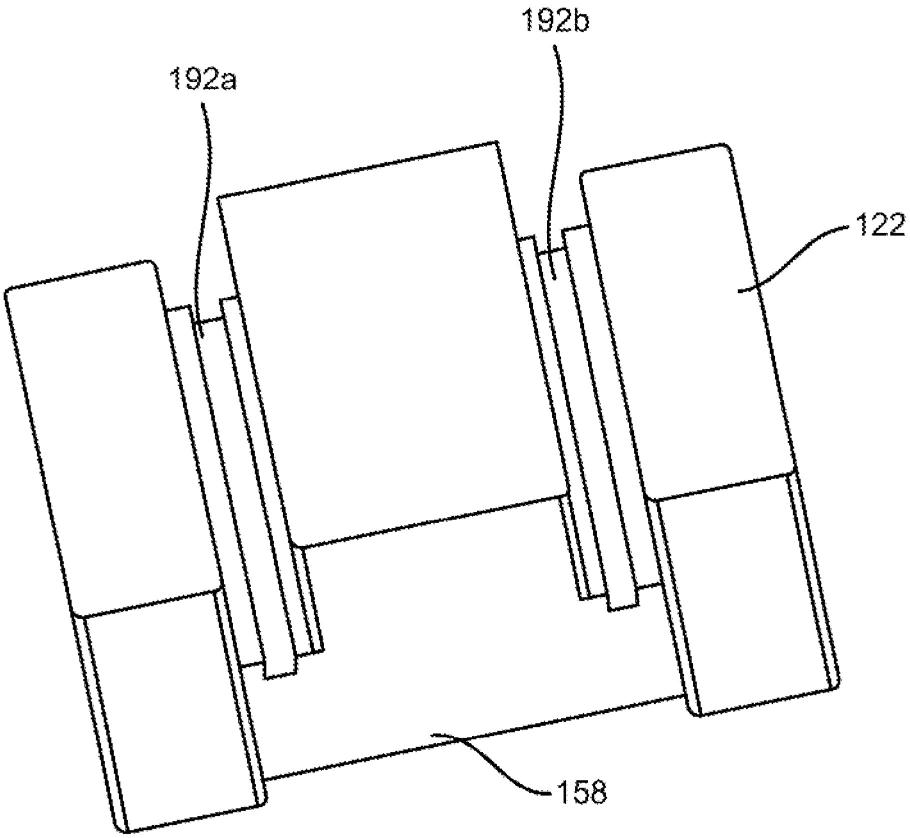
FIG. 19 is a rear side view of an alternative exemplary core piece for an inductor component according to the present invention.
Figure 20:
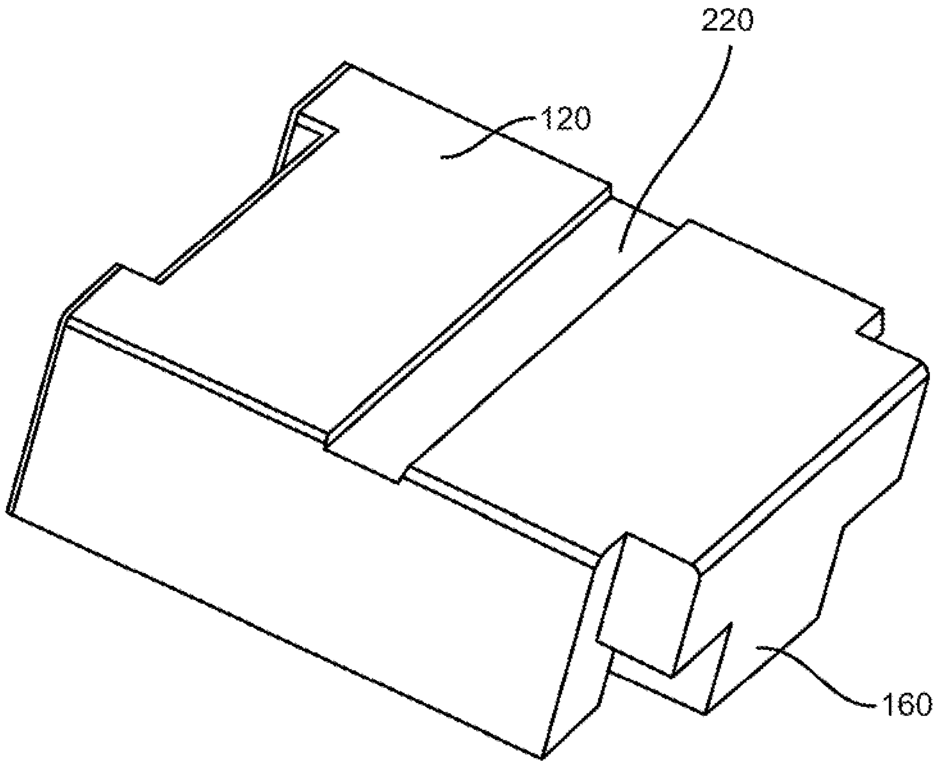
FIG. 20 is a front side view of an alternative exemplary core piece for an inductor component according to the present invention.
Figure 21:
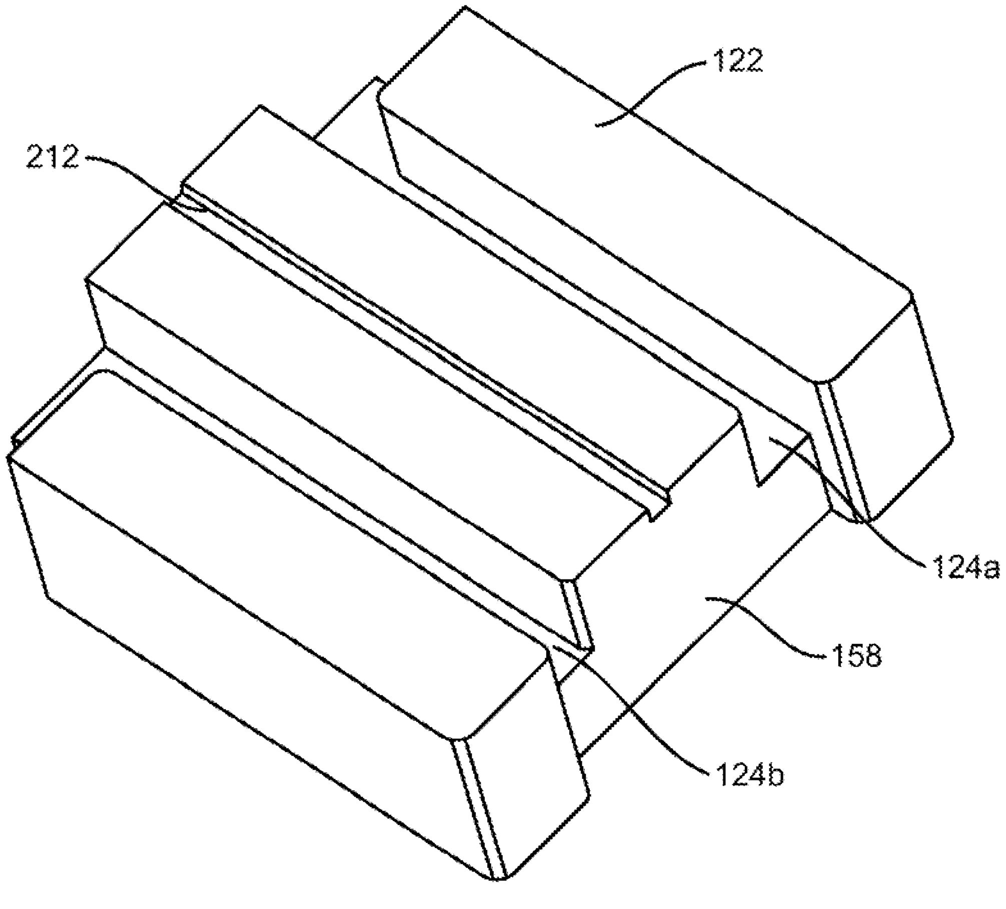
FIG. 21 is a rear side view of an alternative exemplary core piece for an inductor component according to the present invention.
Figure 22:
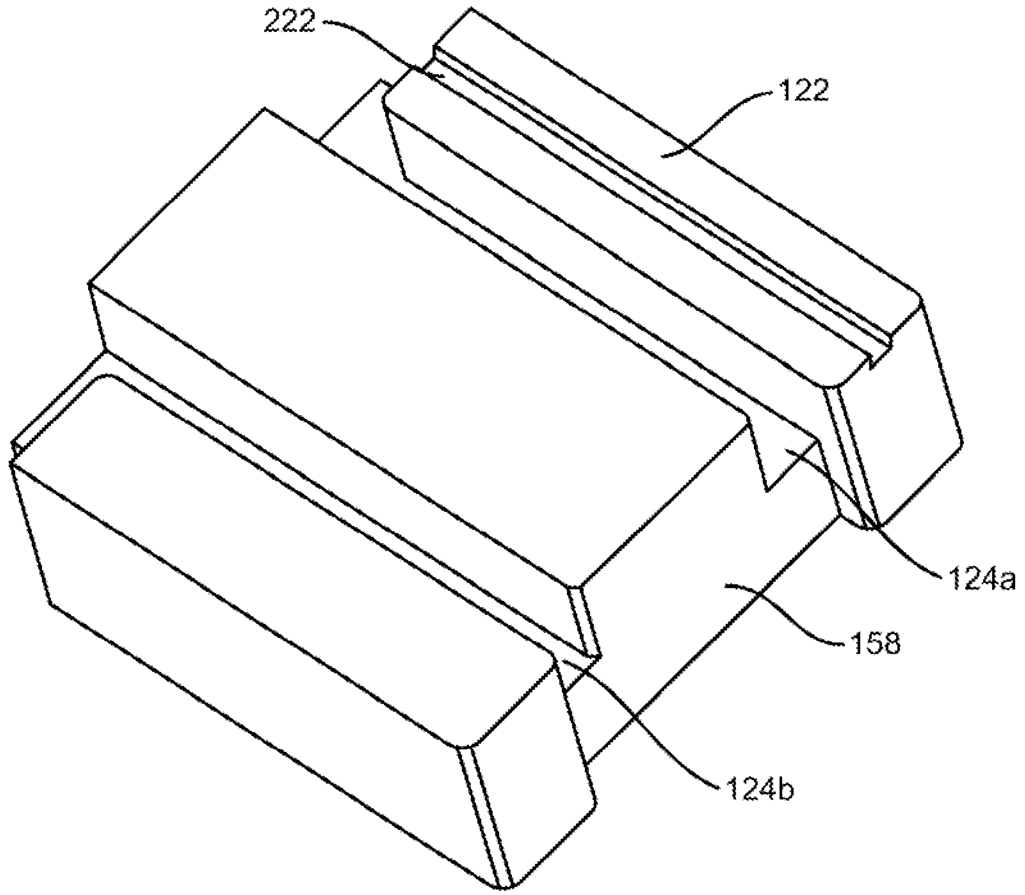
FIG. 22 is a rear side view of an alternative exemplary core piece for an inductor component according to the present invention.

FIGS. 19, 20, 21, and 22 illustrate still other configurations of core pieces that could be assembled with the core piece 106 and create localized magnetic gaps with different employment of interior and exterior grooves or a depressed surface. Such grooves and depressed surface may also be used in combination in different magnetic core pieces in the same core structure or may be used in combination in the same magnetic core piece. For example, in the magnetic core piece as shown in FIG. 19, the first and second core pieces (e.g., 104*a*, 104*b*) may comprise interior grooves 192*a* and 192*b* on the a portion of the rear side that forms the slots (e.g., 124*a*, 124*b*). For example, in the magnetic core piece as shown in FIG. 20, the first and second core pieces (e.g., 104*a*, 104*b*) may comprise exterior groove 220 extending horizontally across the vertical front side (e.g., 120) between side edges (208, 210) of each of the magnetic core pieces. For example, in the magnetic core piece as shown in FIG. 21, the first and second core pieces (e.g., 104*a*, 104*b*) may comprise an interior groove 212 extending vertically across the vertical rear side (122) between the vertical slots of each of the magnetic core pieces from the top side (158) to the bottom side (160). For example, in the magnetic core piece as shown in FIG. 22, the first and second core pieces (e.g., 104*a*, 104*b*) may comprise an interior groove 222 extending vertically across the vertical rear side (122) next to the vertical slots and near the side edges of each of the magnetic core pieces from the top side (158) to the bottom side (160). While numerous examples of magnetic core pieces have been described and illustrated, it is recognized that still further variations are possible that would create similar effect and functionality in inductor components.

Figure 23:
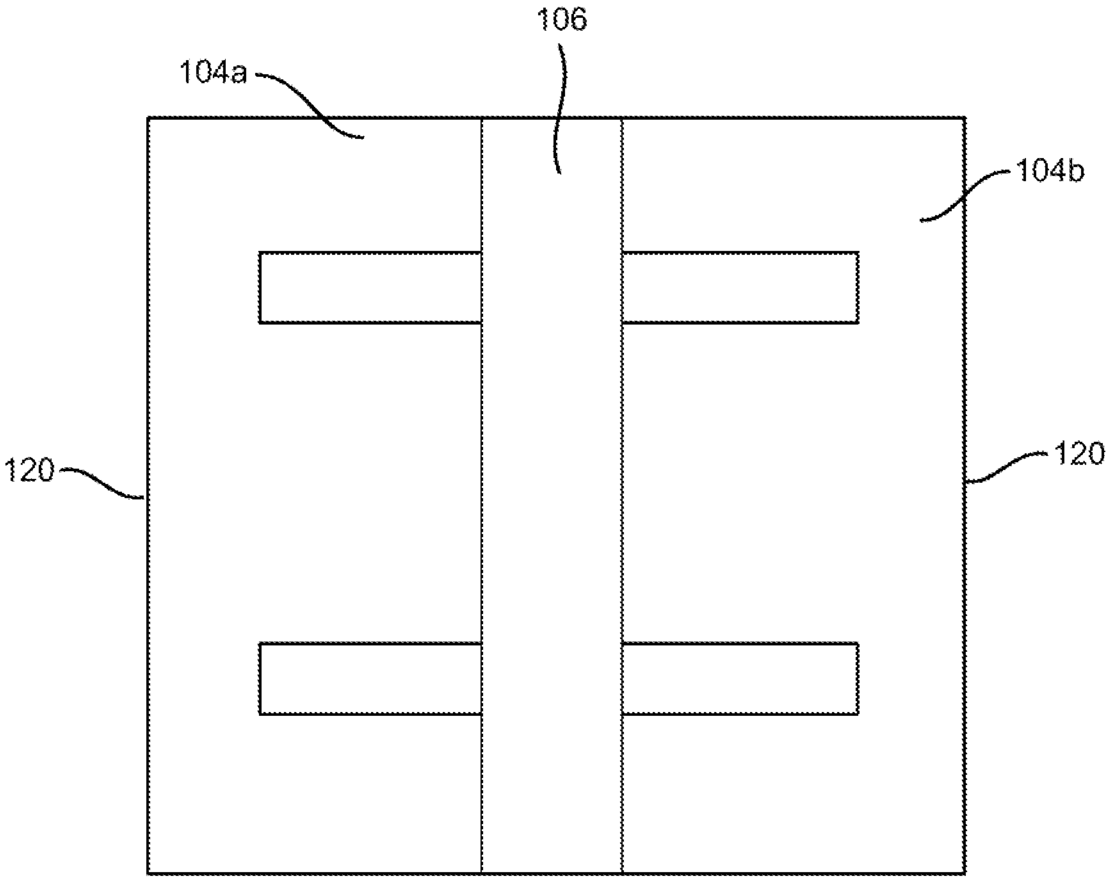
FIG. 23 is a top view of an alternative magnetic core structure for an inductor component according to the present invention.

The concepts described above can also be extended to other magnetic core configurations. For example, FIG. 23 shows another magnetic core structure fabricated from three magnetic core pieces that are different from those described above in the components 100, 150, 200, 250 described above but yet define a similar arrangement of coil slots to accommodate the coils 108*a*, 108*b*. Similar flux paths to those shown in FIG. 18 would be generated, and magnetic gaps can be defined in the core pieces in any manner described above to realize swing inductor effects. In the example shown in FIG. 23, the middle core piece 106 is a simple flat plate while the side core pieces are E-shaped cores when viewed from the top. The core structure shown in FIG. 23 may therefore be referred to as an EIE magnetic core structure.

Figure 24:
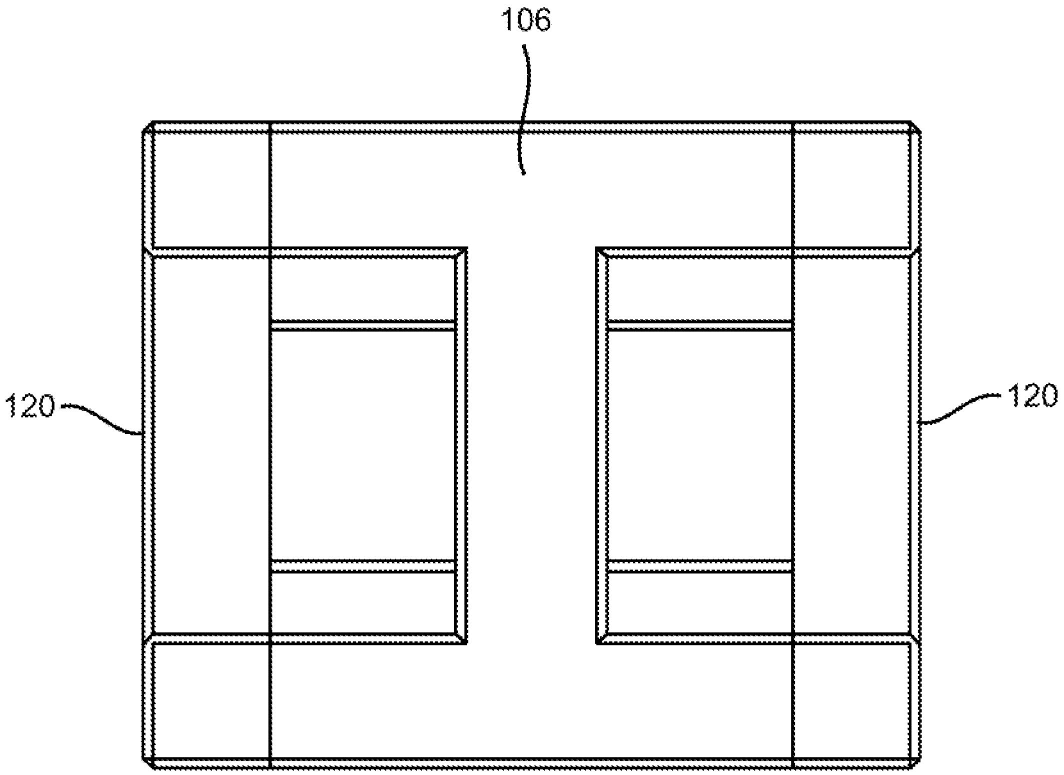
FIG. 24 is a top view of an alternative magnetic core structure for an inductor component according to the present invention.

FIG. 24 illustrates another exemplary magnetic core structure including a wider version of the core piece 106 in the middle that defines the entirety of the coil slots, with core pieces formed as simple flat plates on the sides. The coils 108*a*, 108*b* may be assembled to this core structure, and similar flux paths to those shown in FIG. 18 would be generated. Localized magnetic gaps can be defined in the core pieces in any manner described above to realize swing inductor effects.

Figure 25:
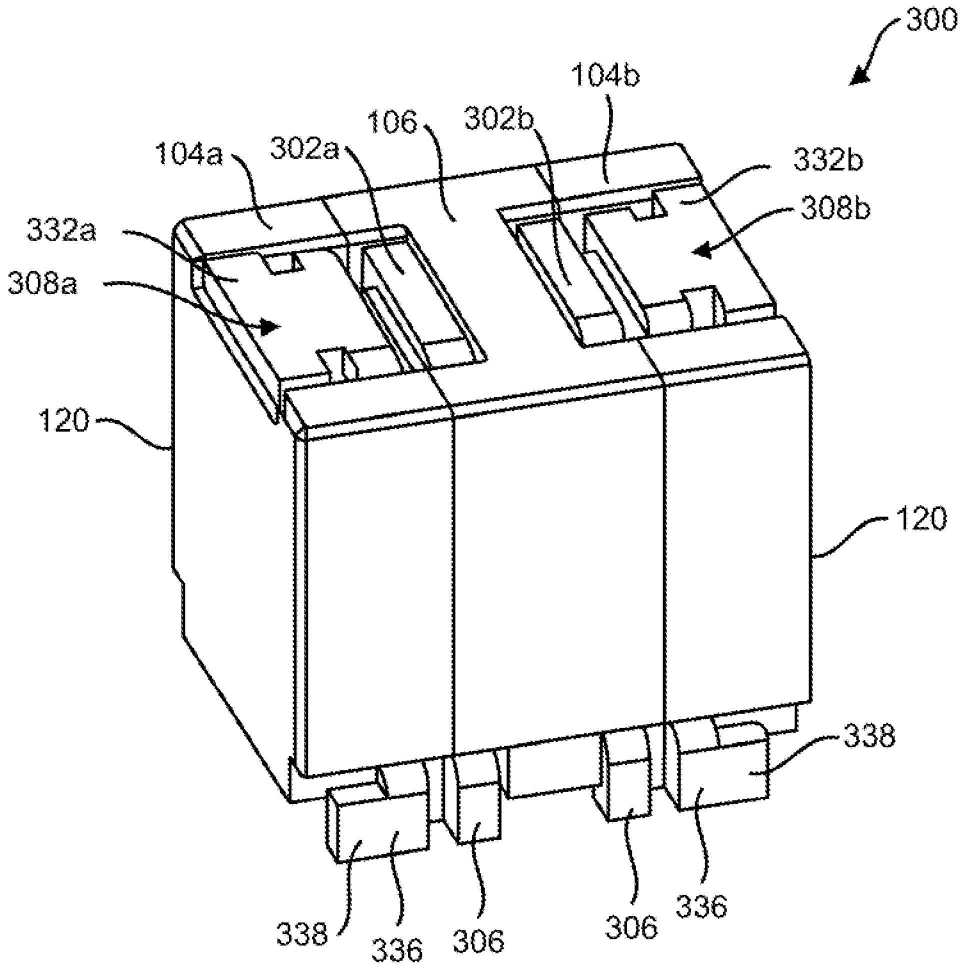
FIG. 25 is a perspective view of a fourth exemplary embodiment of a bottom sunken surface mount inductor component in accordance with the present invention.
Figure 26:
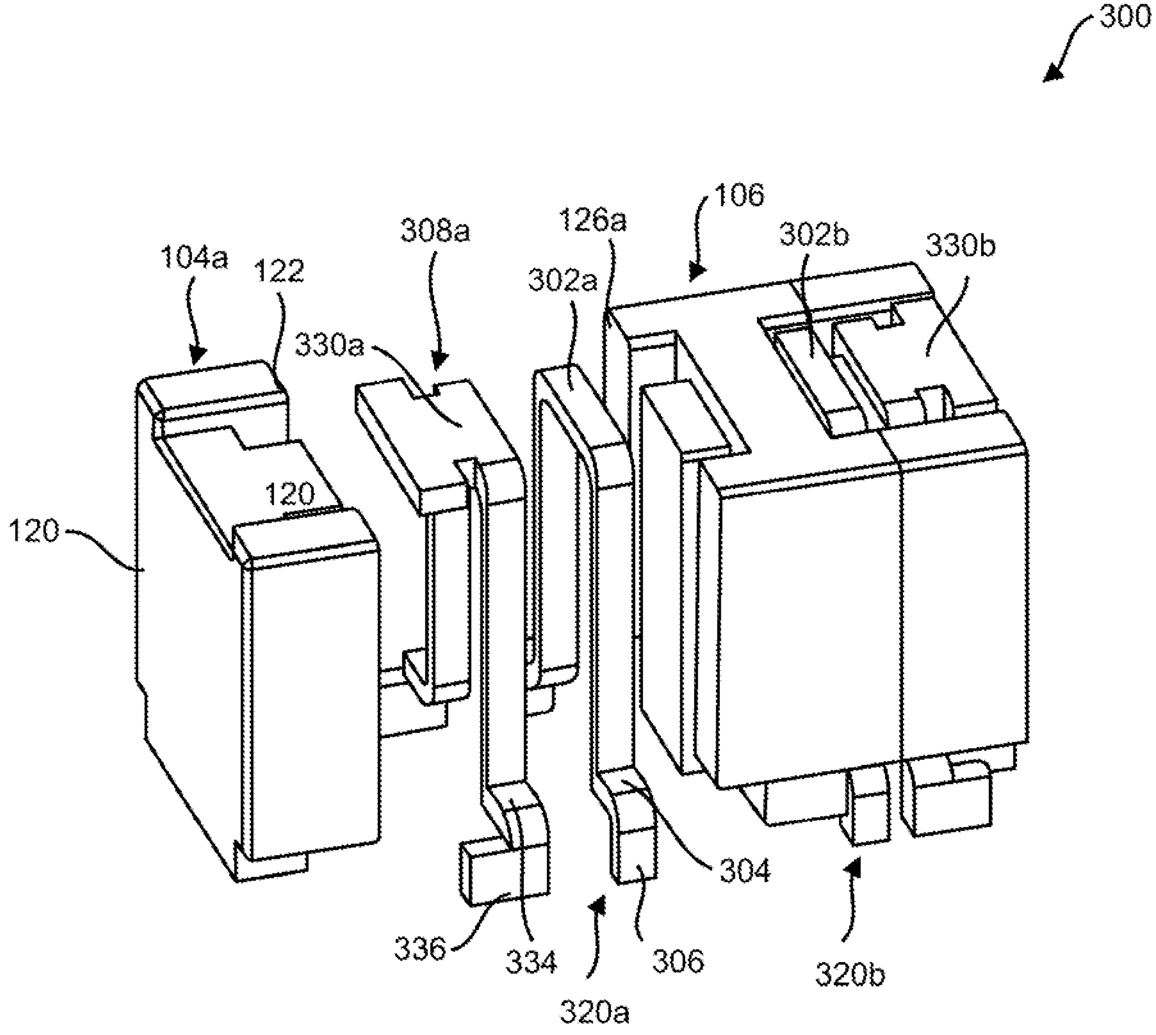
FIG. 26 is an exploded view of the bottom sunken surface mount inductor component shown in FIG. 25.

FIGS. 25-26 are various views of a fourth exemplary embodiment of an inductor component 300 that is similar in many aspects to the inductor component 100, but is further adapted to provide higher power density, better transient and efficiency multiple coupled windings inductor functionality in a manner with ease of assembly and in a desirable package size. The inductor component 300 may be used in addition to or in lieu of the inductor component 100 on the circuit board 110.

The inductor component 300 may comprise a magnetic core structure with core pieces 104*a*, 104*b*, and 106 as described above. The three discrete core pieces 104*a*, 104*b*, and 106 that in combination may receive and contain a pair of primary conductive coils 320*a* and 320*b*, and a pair of secondary conductive coils 308*a* and 308*b* that may be surface mounted to a circuit board 110. In some embodiments, the core pieces 104*a*, 104*b* and 106 may comprise aligned and generally flat top surfaces, with each piece formed with respective depressions to accept a portion of the primary conductive windings 320*a* and 320*b* and a portion of the secondary conductive windings 308*a* and 308*b* as shown on the top side of the core pieces 104*a*, 104*b* and 106.

The primary conductive windings 320*a* and 320*b* as shown in FIG. 26 are U-shaped coils respectively having a top section 302*a*, 302*b* that extends parallel to the plane of the circuit board 110 in a recessed manner on the top side or upper side of the magnetic core piece 106 at a distance spaced from the plane of the circuit board. As such, the top section 330*a*, 330*b* of each coil 308*a*, 308*b* is spaced a maximum vertical distance from the circuit board 110 but is generally flush with the top surface of the magnetic core structure 102. In some embodiments, each primary conductive windings 320*a* and 320*b* may comprise straight and parallel leg sections each extending perpendicular to the top sections 302*a*, 302*b* at each opposing end edge of the top sections 302*a*, 302*b*. The axial length of each of the leg sections is much greater than the axial length of the top sections 302*a*, 302*b* such that each coil 320*a*, 320*b* as shown is much taller than it is wide. The leg sections are received in the coil slots of the core piece 106 in the assembly of the magnetic core structure 102. At the bottom side of each of the coil leg sections, opposite to the top sections 302*a*, 302*b*, surface mount terminations are formed which include a lateral section 304 extending perpendicularly to the vertically extending leg sections and a terminal section 306 that extends perpendicularly to the lateral sections and to the circuit board 110.

The secondary conductive windings 308*a* and 308*b* as shown in FIG. 26 are inverted U-shaped coils respectively having a top section 330*a*, 330*b* that extends parallel to the plane of the circuit board 110 in a recessed manner on the top side or upper side of the magnetic core pieces 104*a* or 104*b* at a distance spaced from the plane of the circuit board. As such, the top section 330*a*, 330*b* of each coil 308*a*, 308*b* is spaced a maximum vertical distance from the circuit board 110 but is generally flush with the top surface of the magnetic core structure 102. The top section 330*a*, 330*b* of each coil 308*a*, 308*b* further includes an extension 332*a*, 332*b* that extends to the front wall 120 of each core piece 104*a*, 104*b* in the completed assembly. The extensions 132*a*, 132*b* increase the surface area of the top sections 330*a*, 330*b* of the coils 308*a*, 308*b*. The increased surface on the top sections of the coils 308*a*, 308*b* area beneficially provides an alignment feature that facilitates an easier assembly of the coils 308*a*, 308*b* to the core pieces 104*a*, 104*b*, improves heat dissipation in the operation of the inductor component and a component beneath the inductor component via the bottom sunken feature described below, and increases the cross-sectional area to DCR of the inductor component 100 in use.

In some embodiments, each secondary conductive windings 308*a* and 308*b* may comprise straight and parallel leg sections each extending perpendicular to the top sections 330*a*, 330*b* at each opposing end edge of the top sections 330*a*, 330*b*. The leg sections are received in the coil slots of the core pieces 104*a*, 104*b* in the assembly of the magnetic core structure 102. Similar to windings 108*a*, 108*b* as shown is FIG. 1, at the bottom side of each of the coil leg sections, opposite to the top sections 330*a*, 330*b*, surface mount terminations are formed which include a lateral section 334 extending perpendicularly to the vertically extending leg sections and a terminal section 336 that extends perpendicularly to the lateral sections and to the circuit board 110. The terminal sections 336 also include extensions 338 that extend toward the front side 120 of each core piece 104*a*, 104*b* but that do not reach the front side 120. The extensions 338 provide an increased surface area on the bottom of the terminals to facilitate surface mounting of the component 100 to the circuit board 110.

In some embodiments, the primary conductive windings 320*a* and 320*b* may be of the same height from the top sections 302*a*, 302*b* to the terminal section 304 as height if the secondary conductive windings 308*a* and 308*b* from the top sections 330*a*, 330*b* to the terminal section 336. In some embodiments, distance between the leg sections of the primary conductive windings 320*a* and 320*b* may be the same as distance between the leg sections of the secondary conductive windings 308*a* and 308*b*. In some embodiments, when assembling, the primary conductive windings and the secondary conductive windings may be assembled with a space in between.

Figure 27:
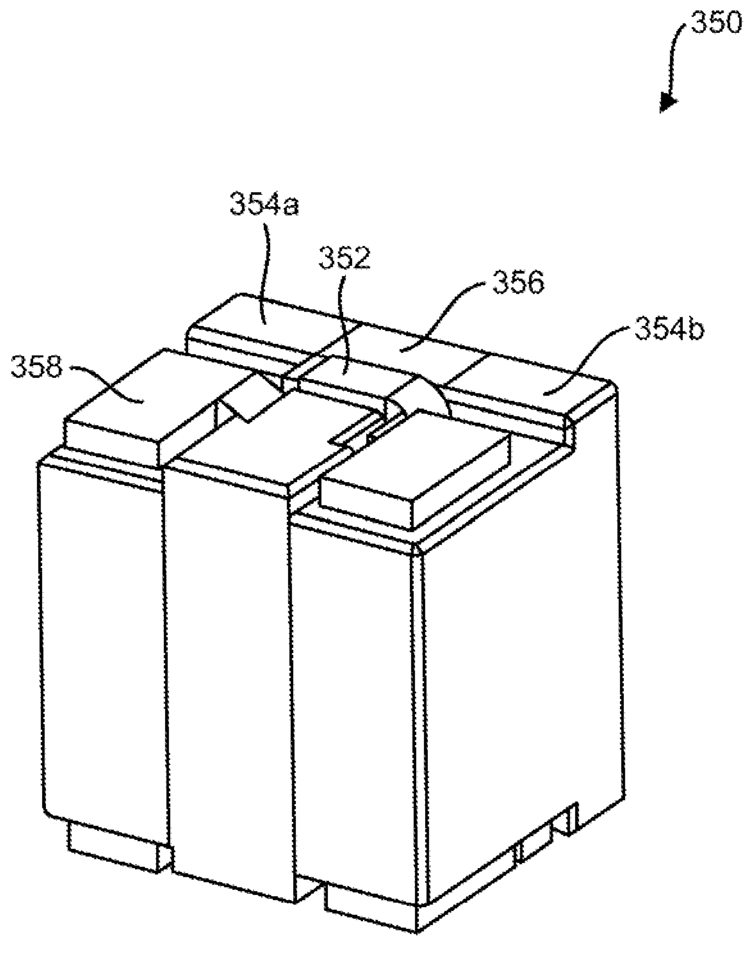
FIG. 27 is a perspective view of a fifth exemplary embodiment of a bottom sunken surface mount inductor component in accordance with the present invention.
Figure 28:
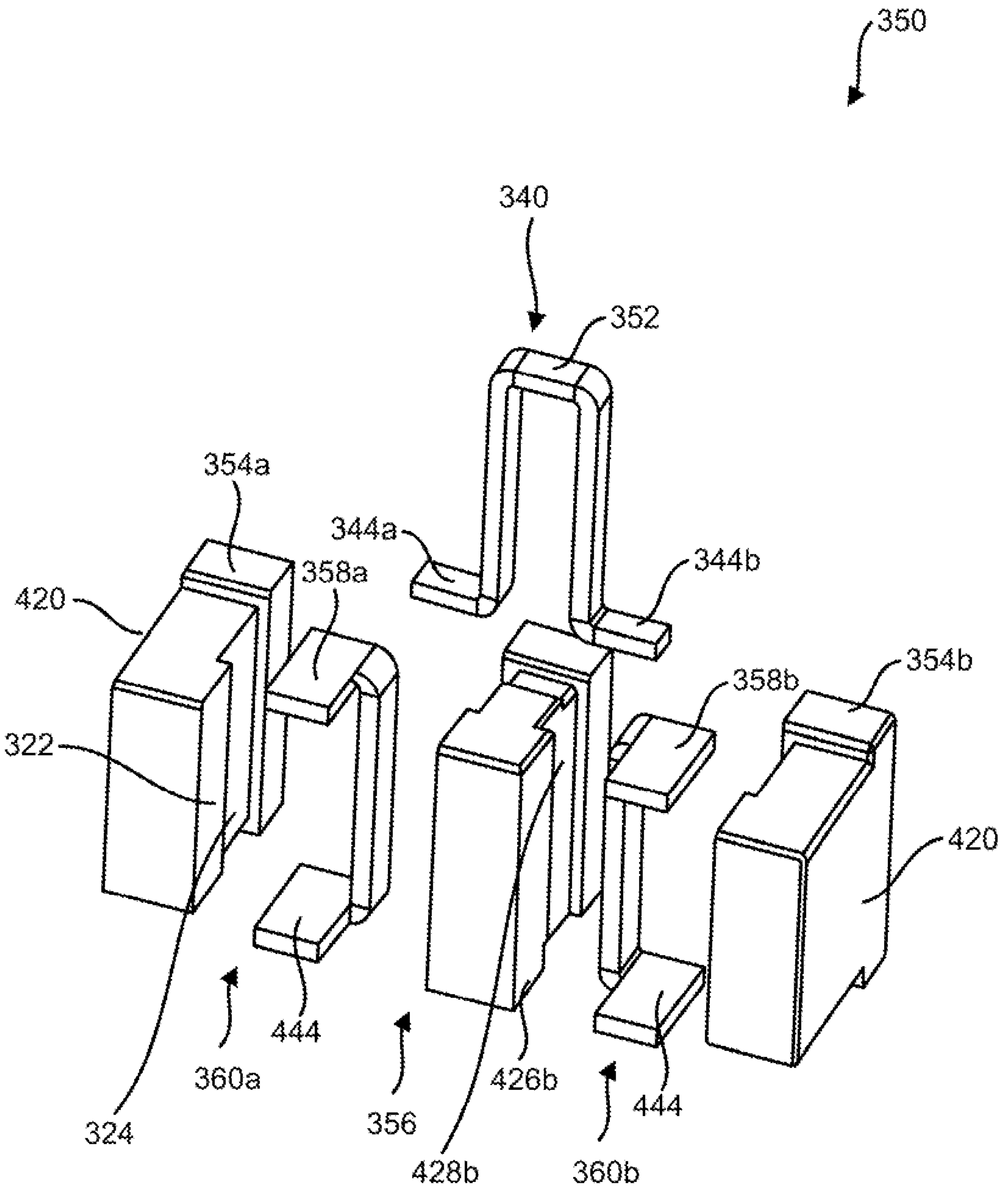
FIG. 28 is an exploded view of the bottom sunken surface mount inductor component shown in FIG. 27.

FIGS. 27-28 are various views of a fifth exemplary embodiment of an inductor component 350 that is similar in many aspects to the inductor component 100, but is further adapted to provide higher power density, better transient and efficiency multiple coupled windings inductor functionality in a manner with ease of assembly and in a desirable package size. The inductor component 350 may be used in addition to or in lieu of the inductor component 100 on the circuit board 110.

In some embodiments, the inductor component 350 may comprise a magnetic core structure fabricated in three discrete core pieces 354*a*, 354*b*, and 356 that in combination to receive and contain a primary conductive winding 340 and a pair of secondary conductive windings 360*a* and 360*b* that may be surface mounted to a circuit board 110. The magnetic core pieces 354*a*, 354*b* may be similarly sized and shaped core pieces having a front side 420 and a rear side 322. The front side 420 may be flat and smooth while the rear side 122 may be formed with a vertically extending recessed space 324. The recessed space 324 may be spaced from the respective side edges of the core pieces 354*a*, 354*b* that interconnect the front and rear sides 420, 322 as shown.

The magnetic core piece 356, unlike the core pieces 354*a* and 354*b*, may comprise opposing sides 426*a*, 426*b* that each comprise a vertically extending recessed spaces 428*a*, 428*b*. The recessed space 428*a*, 428*b* may be spaced from the respective side edges of the core pieces 356 that interconnect the front and rear sides opposing sides 426*a*, 426*b* as shown. The recessed space 324 on the rear side 322 in each core piece 354*a*, 354*b* may align with and face the respective recessed spaces 428*a*, 428*b* in each side of the core piece 356.

In some embodiments, the core pieces 354*a*, 354*b*, and 356 may comprise aligned and generally flat top surfaces, with each piece formed with respective depressions to accept a portion of the primary conductive winding 340 or secondary conductive windings 360*a*, and 360*b* as shown on the top side of the core pieces 354*a*, 354*b* and 356. The rear sides 322 of the magnetic core pieces 354*a*, 354*b* may be optionally spaced or gapped from the respective sides 426*a*, 426*b* of the magnetic core piece 356 in the magnetic core structure as needed to realize initial inductance requirements.

The primary conductive winding 340 as shown in FIG. 28 is a U-shaped coil having a top section 352 that extends parallel to the plane of the circuit board 110 in a recessed manner on the top side or upper side of the magnetic core piece 356 at a distance spaced from the plane of the circuit board. The primary conductive winding 340 may comprise straight and parallel leg sections each extending perpendicular to the top sections 130*a*, 130*b* at each opposing end edge of the top section 352. The axial length of each of the leg sections may be greater than the axial length of the top section 352 such that primary conductive winding 340 as shown is much taller than it is wide. The leg sections may be received in the recessed spaces 428*a*, 428*b* of the core pieces 356 in the assembly of the magnetic core structure. At the bottom side of each of the coil leg sections, opposite to the top sections 130*a*, 130*b*, surface mount terminations may be formed, which may comprise lateral sections 334*a*, 334*b* extending perpendicularly to the vertically extending leg sections. The lateral sections 334*a*, 334*b* may provide an increased surface area on the bottom of the terminals to facilitate surface mounting of the component 350 to the circuit board 110. The lateral sections 344*a*, 344*b* may be assembled under the bottom side of the core pieces 354*a*, 354*b* in a recessed space formed on the bottom side of the core pieces 354*a*, 354*b*.

The secondary conductive windings 360*a*, and 360*b* as shown in FIG. 28 are I-shaped coils having top sections 358*a*, 358*b* that may extend parallel to the plane of the circuit board 110 in a recessed manner on the top side or upper side of each magnetic core pieces 345*a*, 354*b* at a distance spaced from the plane of the circuit board. Each secondary conductive windings 360*a*, and 360*b* may comprise a straight leg section extending perpendicular to the top sections 358*a*, 358*b* at each opposing end edge of the top sections 358*a*, 358*b*. At the bottom side of the coil leg sections, opposite to the top sections 358*a*, 358*b*, surface mount terminations may be formed, which may comprise a lateral section 444 extending perpendicularly to the vertically extending leg section. The lateral section 444 may extend facing the direction that towards the core pieces 354*a*, 354*b*. the lateral section 444 may be symmetrical to the top section 358*a*, 358*b* about the leg section. The lateral sections 444 may provide an increased surface area on the bottom of the terminals to facilitate surface mounting of the component 350 to the circuit board 110. Each of the lateral sections 444 may be assembled under the bottom side of the core pieces 354*a*, 354*b* in a recessed space formed on the bottom side of the core pieces 354*a*, 354*b*.

The primary winding 340 and each of secondary windings 360*a*, 360*b* may be coupled individual, wherein the primary winding 340 may be decoupled or weak coupled between the two secondary windings 360*a*, 360*b*.

Figure 29:
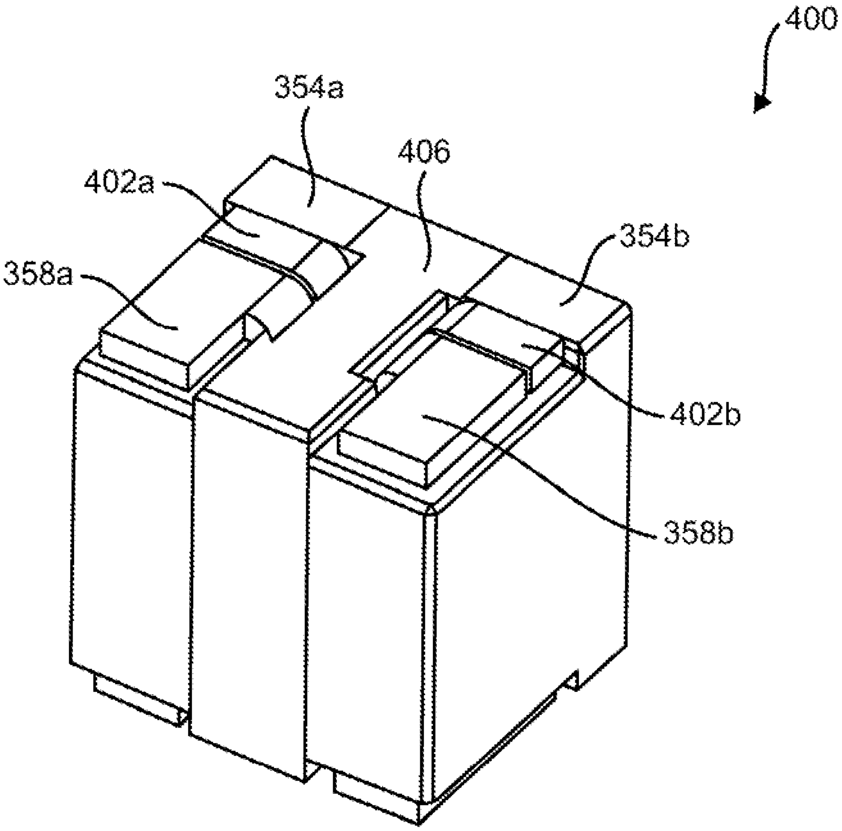
FIG. 29 is a perspective view of a sixth exemplary embodiment of a bottom sunken surface mount inductor component in accordance with the present invention.
Figure 30:
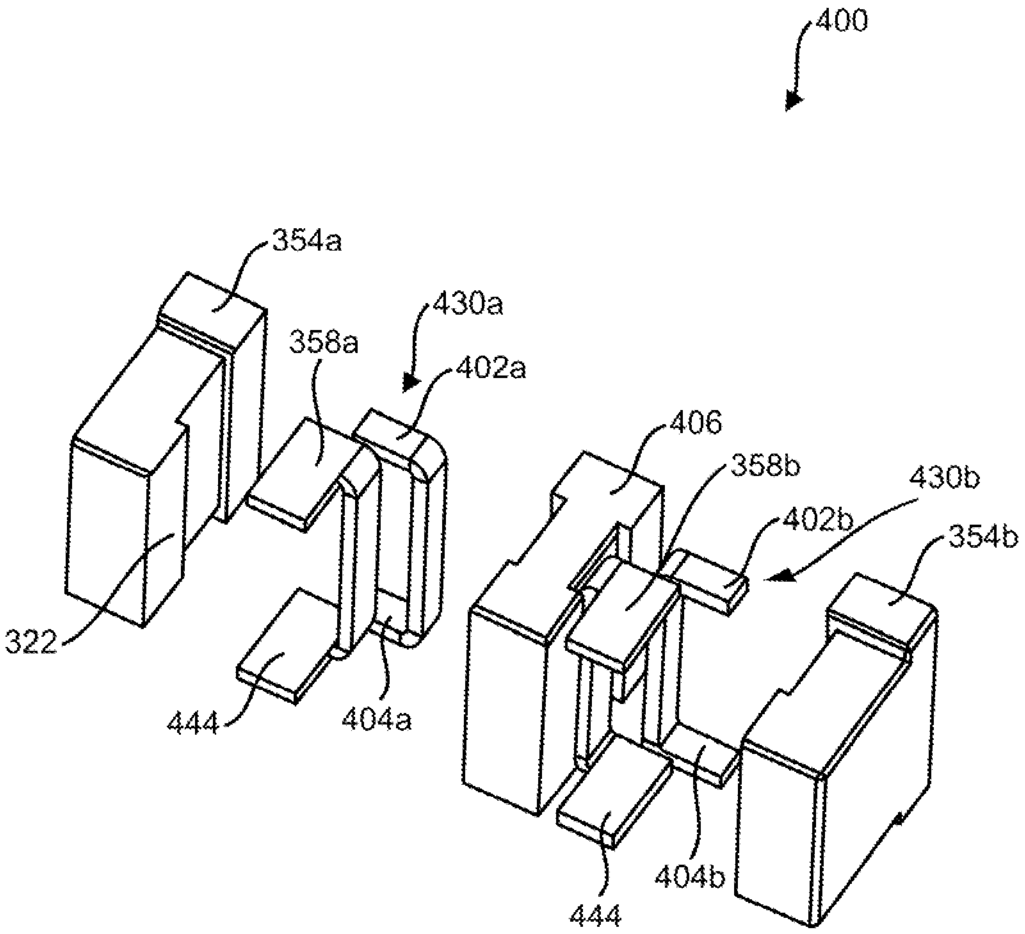
FIG. 30 is an exploded view of the bottom sunken surface mount inductor component shown in FIG. 29.

FIGS. 29-30 are various views of a sixth exemplary embodiment of an inductor component 400 that is similar in many aspects to the inductor component 350. The inductor component 400 may be used in addition to or in lieu of the inductor component 100 and/or inductor component 350 on the circuit board 110. The inductor component 400 may comprise core pieces 354*a*, 354*b* and secondary conductive windings 360*a*, and 360*b* as described in inductor components 350 as shown in FIG. 28. Additionally or alternatively, the inductor component 400 may comprise I-shaped core piece 406 and a pair of C-shaped primary conductive windings 430*a*, 430*b*.

In some embodiments, the I-shaped core piece 406 may comprise a flat top surface. The primary conductive windings pair 430*a*, 430*b* as shown in FIG. 30 are C-shaped coils having top sections 402*a*, 402*b* that may extend parallel to the plane of the circuit board 110 in a recessed manner on the top side or upper side of each magnetic core pieces 345*a*, 354*b* at a distance spaced from the plane of the circuit board. Each of the primary conductive windings 430*a*, 430*b* may comprise a straight leg section extending perpendicular to the top sections 402*a*, 402*b* at each opposing end edge of the top sections 402*a*, 402*b*. At the bottom side of the coil leg sections, opposite to the top sections 402*a*, 402*b*, surface mount terminations may be formed, which may comprise a lateral section 404*a*, 404*b* extending perpendicularly to the vertically extending leg section. The lateral section 444 may extend facing the direction that towards the core pieces 354*a*, 354*b*. The lateral sections 444 may provide an increased surface area on the bottom of the terminals to facilitate surface mounting of the component 350 to the circuit board 110.

Figure 31:
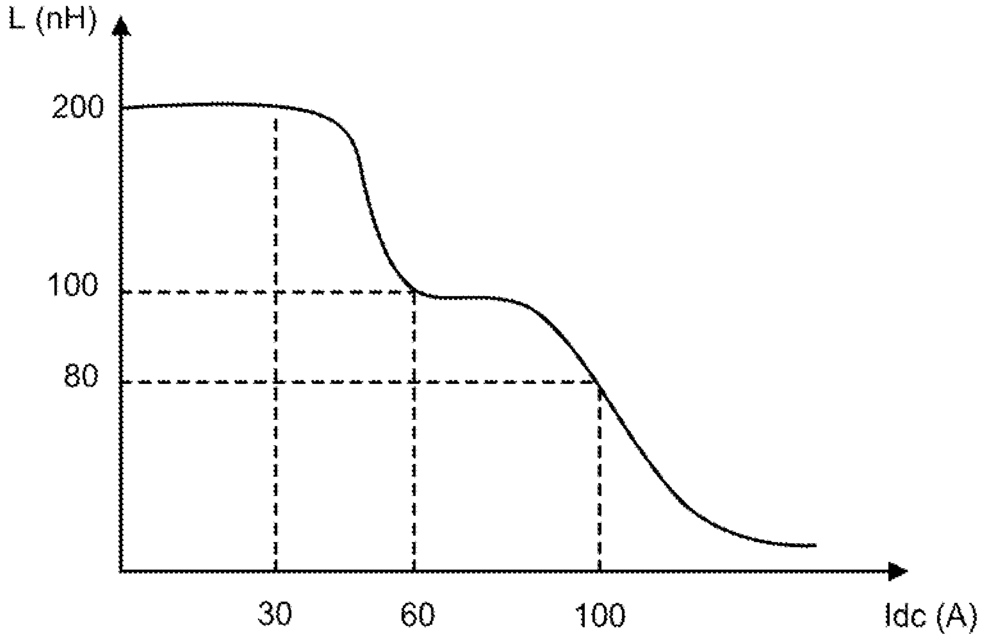
FIG. 31 is an exemplary graphical illustration of steps of inductance rolloff characteristics of swing inductor components according to the present invention
Figure 32:
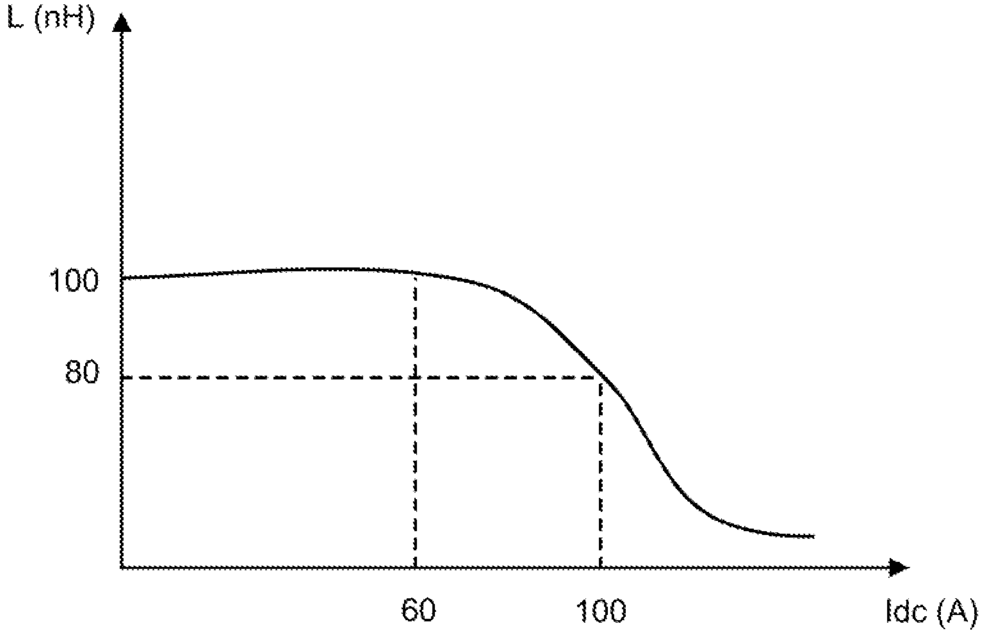
FIG. 32 is an exemplary graphical illustration of inductance rolloff characteristics of conventional non-swing type inductor components.

Any of the magnetic core structures described above may be constructed from simply shaped core pieces and may therefore be provided at lower cost with simpler assembly than conventional inductor components with bottom sunken features and/or swing-type inductors that necessitate more complicated shapes of magnetic pieces and more complicated winding structures. FIG. 31 is an exemplary graphical illustration of steps of inductance rolloff characteristics of a swing inductor that may be exhibited in the inductor components and magnetic core structures described above. FIG. 32 is an exemplary graphical illustration of inductance rolloff characteristics of conventional non-swing type inductor components for comparison.

The inductance characteristics are shown in FIGS. 31 and 32 in the form of inductance plots wherein inductance values correspond to the vertical axis and wherein current values correspond to the horizontal axis. As seen in the inductance plots, the conventional non-swing type inductor exhibits a fixed and generally constant inductance value indicated by the horizontal line at the left-hand side of FIG. 32 that represents a constant open circuit inductance (OCL) value over a normal operating range of current values. The open circuit inductance (OCL) value is the same regardless of the actual current load in use within the normal operating range of the inductor. As such, when the inductor is operated at a current up to its saturation current (Isat) that represents a full load inductance (FLL) or full load operation, the inductor exhibits a fixed and generally constant inductance value corresponding to a full load inductance (FLL) value regardless of the actual current load.

In contrast, and as can be seen in the plot in FIG. 31 for the "swing" inductor, the swing inductor has an inductance that varies with the current load, and specifically can be operated at a higher inductance value under certain current loads, while changing or swinging to a lower inductance value for another range of relatively higher currents. As such, the "swing" inductor exhibits multiple steps of inductance rolloff characteristics while the "regular" or non-swing inductor does not as evident from FIG. 32. The non-swing inductor as shown in FIG. 32 operates with a single step rolloff characteristic. The multiple step rolloff characteristics of the swing inductor as shown in FIG. 31 provides substantial performance benefits for certain power converter applications relative to a regular inductor (i.e., a non-swing-type inductor). Specifically, the swing inductor may operate with high inductance at a range of light (i.e., lower) current loads until eventually becoming saturated via the magnetic gaps provided in the embodiments described above until the OCL drops and realizes a higher DC bias resistance for a range of heavy (i.e. higher) current loads, while returning back to the high inductance when the current load returns back to a range of light current load.

The inductor components described above offer a considerable variety of swing-type inductor functionality with bottom sunken features in an economical manner while using a small number of component parts that are manufacturable to provide small inductors at relatively low cost with superior performance advantages. Particularly in the case of high-power density electrical power system applications such as the multi-phase power supply circuits and power converters for computer servers, computer workstations and telecommunication equipment, the swing-type inductor components described herein are operable with desired package size and desired efficiency that is generally beyond the capability of conventionally constructed surface mount swing-type inductor components.

It is understood that the bottom sunken features and the swing inductor features can be practiced separately and in combination. While some of the examples above combine these features into the same component, the magnetic gaps in the magnetic core structures do not necessarily depend on the bottom sunken features of the coils 108*a*, 108*b*. Embodiments are therefore contemplated wherein the magnetic core structures and magnetic core pieces are used with coils that do not include integrated bottom sunken features such as those described above and vice versa. In other words, while the magnetic core structures described above may be particularly beneficial for use with the coils 108*a*, 108*b* described above, their benefits are not necessarily limited to the coils 108*a*, 108*b* and as such other conductive coils may be employed while realizing some of the same benefits. Likewise, the benefits of the coils 108*a*, 108*b* are not necessarily limited to the specific magnetic core pieces described herein and as such the coils 108*a*, 108*b* may be used with alternative magnetic core pieces while still realizing similar benefits.

Finally, the concepts above can be extended to single phase inductor components (i.e., inductor component having only one coil) and to integrated inductor components having more than two coils. The bottom sunken features and/or the swing inductor features are scalable by adding or subtracting the number of coils and core pieces to flexibly meet different needs while using a reduced number of component parts that can be assembled in various different combinations.

The benefits and advantages of the inventive concepts are now believed to have been amply illustrated in view of the exemplary embodiments disclosed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inductor assembly for a circuit board, the inductor assembly comprising:

a magnetic core structure, comprising:

first and second magnetic core pieces, wherein each of the first and second magnetic core pieces comprises a top side, a bottom side, a vertical front side, and a vertical rear side comprising a first vertical slot and a second vertical slot extending in spaced apart relation from the first vertical slot; and a third magnetic core piece interposed between the vertical rear sides of the first magnetic core piece and the second magnetic core piece, the third magnetic core piece comprising opposing top and bottoms sides and opposing vertical sides, wherein a combination of each of the first and second magnetic core pieces and the third magnetic core piece defines coil slots; and a first conductive winding assembled to the first magnetic core piece and the third magnetic core piece, and a second conductive winding assembled to the second magnetic core piece and the third magnetic core piece, each of the first and second conductive windings comprises a top section and first and second leg sections each extending perpendicular to the top section, wherein the top section of each of the conductive windings comprises an extension configured to be received at a respective recessed top surface of each of the first and second magnetic core pieces, wherein the extension is T-shaped, wherein each of the first and second leg sections of each of the first and second conductive windings comprises a surface mount termination located at a bottom section of that leg section, wherein when the first, second, and third magnetic core pieces are combined with the first and second conductive windings to form the inductor assembly, the surface mount terminations of the first and second leg sections protrude downward relative to the bottom sides of the first, second, and third magnetic core pieces to from a space between the inductor assembly and the circuit board.

2. The inductor assembly of claim 1, wherein the first and second magnetic core pieces being formed and arranged as mirror images of one another.

3. The inductor assembly of claim 1, wherein the third magnetic core piece being differently shaped from the first and second magnetic core pieces.

4. The inductor assembly of claim 1, wherein each of the opposing vertical sides comprises a third vertical slot and a fourth vertical slot, wherein the first and second vertical slots on the vertical rear side of each of the first and second magnetic core pieces align with the third and fourth vertical slots on each of the opposing sides of the third magnetic core piece respectively.

5. The inductor assembly of claim 1, wherein the combination of each of the first and second magnetic core pieces and the third magnetic core piece further defines a combined recessed top surface.

6. The inductor assembly of claim 1, wherein the first and second leg sections each extending perpendicular to the top section at each opposing end edge of the top section, wherein the first and second legs sections of each respective first and second conductive windings are respectively received in the coil slots of the magnetic core structure.

7. The inductor assembly of claim 1, wherein the surface mount termination is configured to increase width of a bottom end of each of the conductive windings.

8. The inductor assembly of claim 1, wherein the first vertical slot and the second vertical slot are parallel and are spaced from side edges of the first and second magnet core pieces that interconnect the vertical front side and the vertical rear side.

9. The inductor assembly of claim 1, wherein the first and second conductive windings are U-shaped coils.

10. The inductor assembly of claim 1, wherein the each of the first, the second, and the third core pieces defines half of at least one of the coil slot.

11. The inductor assembly of claim 1, wherein the bottom sides of the first, the second and the third magnetic core pieces are flat and extend coplanar to one another in a spaced apart and are parallel to the plane of the circuit board.

12. The inductor assembly of claim 1, wherein the vertical rear side (122) of each of the first and the second magnetic core pieces is gapped from each of the opposing vertical sides of the third magnetic core piece.

13. The inductor assembly of claim 1, wherein the extension extends to the vertical front side of each of the first and the second magnetic core pieces.

14. The inductor assembly of claim 1, wherein the surface mount termination comprises a lateral section extending perpendicularly to the leg section, and a terminal section that extends perpendicularly to the lateral section and to the circuit board.

15. The inductor assembly of claim 14, wherein the terminal section further comprises a terminal extension extending toward the vertical front side but not reaching the vertical front side of each of the first and second magnetic core pieces.

16. The inductor assembly of claim 1, wherein the first, second, or third magnetic core pieces comprises one or more cutouts on a surface to define an inductance profile of that magnetic core piece, each of the one or more cutouts defining a first cross-sectional area different from a second cross sectional area of another portion of the surface without the cutout.

17. The inductor assembly of claim 16, wherein the one or more cutouts comprise one or more exterior grooves (156) extending vertically in a spaced apart on the vertical front side (120) from the top side (158) to the bottom side (160) of each of the magnetic core pieces.

18. The inductor assembly of claim 16, wherein the one or more cutouts comprise an interior groove (206) extending horizontally across the vertical rear side (122) between side edges (208, 210) of each of the magnetic core pieces.

19. The inductor assembly of claim 16, wherein the one or more cutouts comprises a depressed planar surface (256) extending vertically across the vertical rear side (122) between the vertical slots of each of the magnetic core pieces from the top side (158) to the bottom side (160).

20. The inductor assembly of claim 19, wherein the depressed planar surface (256) extends in recessed manner on the vertical rear side (122) of each of the magnetic core pieces.

21. The inductor assembly of claim 19, wherein the depressed planar surface (256) has a cutout depth less than a slot depth of the first vertical slot (124*a*) and the second vertical slot (124*b*).

22. The inductor assembly of claim 1, wherein a shape of each of the extensions from a top view perspective is aligned with a shape formed jointly by the respective recessed top surface and the respective first and second vertical slots from the top view perspective.

* * * * *